(12) United States Patent
Rosenberg et al.

(10) Patent No.: US 10,439,836 B2
(45) Date of Patent: Oct. 8, 2019

(54) SYSTEMS AND METHODS FOR HYBRID SWARM INTELLIGENCE

(71) Applicant: Unanimous A. I., Inc., San Francisco, CA (US)

(72) Inventors: Louis B. Rosenberg, San Luis Obispo, CA (US); Niccolo Pescetelli, Cambridge, MA (US); David Baltaxe, Arlington, VA (US)

(73) Assignee: Unanimous A. I., Inc., San Francisco, CA (US)

(*) Notice: Subject to any disclaimer, the term of this patent is extended or adjusted under 35 U.S.C. 154(b) by 196 days.

(21) Appl. No.: 15/815,579

(22) Filed: Nov. 16, 2017

(65) Prior Publication Data

US 2018/0076968 A1 Mar. 15, 2018

Related U.S. Application Data

(63) Continuation-in-part of application No. PCT/US2017/040480, filed on Jun. 30, 2017, and a
(Continued)

(51) Int. Cl.
*G06F 3/048* (2013.01)
*H04L 12/18* (2006.01)
(Continued)

(52) U.S. Cl.
CPC ...... *H04L 12/1827* (2013.01); *G06F 3/04847* (2013.01); *G06F 9/453* (2018.02);
(Continued)

(58) Field of Classification Search
CPC .................................................... G06F 3/048
See application file for complete search history.

(56) References Cited

U.S. PATENT DOCUMENTS

| 5,808,908 A | 9/1998 | Ghahramani |
| 7,158,112 B2 | 1/2007 | Rosenberg |

(Continued)

FOREIGN PATENT DOCUMENTS

| CA | 2414397 | 8/2003 |
| JP | 5293249 | 9/2013 |

(Continued)

OTHER PUBLICATIONS

"Dialogr—A simple tool for collective thinking"; Mar. 25, 2015; http://www.dialogr.com/; 1 page.
(Continued)

*Primary Examiner* — Pei Yong Weng
(74) *Attorney, Agent, or Firm* — Fitch, Even, Tabin & Flannery LLP

(57) ABSTRACT

Systems and methods for real-time collaborative computing and collective intelligence are disclosed. A hybrid swarm intelligence system includes a central collaboration server, a plurality of computing devices in communication with the central server, and an agent application in communication with the central server. In response to information sent from the central server during a group collaboration session, user input is sent to the central server via the computing devices, and machine input is given to the server via the agent application, which determines input based on rules, additional data, and/or machine learning techniques. The central server uses the user input and the machine input to repeatedly provide feedback to the agent application and users during the group collaboration session.

30 Claims, 13 Drawing Sheets

Related U.S. Application Data continuation-in-part of application No. 15/640,145, filed on Jun. 30, 2017, now Pat. No. 10,353,551, and a continuation-in-part of application No. 15/241,340, filed on Aug. 19, 2016, now Pat. No. 10,222,961, and a continuation-in-part of application No. PCT/US2016/040600, filed on Jul. 1, 2016, and a continuation-in-part of application No. 15/199,990, filed on Jul. 1, 2016, and a continuation-in-part of application No. 15/086,034, filed on Mar. 30, 2016, now Pat. No. 10,310,802, and a continuation-in-part of application No. 15/052,876, filed on Feb. 25, 2016, now Pat. No. 10,110,664, and a continuation-in-part of application No. 15/047,522, filed on Feb. 18, 2016, now Pat. No. 10,133,460, and a continuation-in-part of application No. 15/017,424, filed on Feb. 5, 2016, and a continuation-in-part of application No. 14/925,837, filed on Oct. 28, 2015, and a continuation-in-part of application No. 14/920,819, filed on Oct. 22, 2015, now Pat. No. 10,277,645, and a continuation-in-part of application No. PCT/US2015/056394, filed on Oct. 20, 2015, and a continuation-in-part of application No. 14/859,035, filed on Sep. 18, 2015, now Pat. No. 10,122,775, and a continuation-in-part of application No. 14/738,768, filed on Jun. 12, 2015, now Pat. No. 9,940,006, and a continuation-in-part of application No. PCT/US2015/035694, filed on Jun. 12, 2015, and a continuation-in-part of application No. 14/708,038, filed on May 8, 2015, and a continuation-in-part of application No. 14/668,970, filed on Mar. 25, 2015, now Pat. No. 9,959,028, and a continuation-in-part of application No. PCT/US2015/022594, filed on Mar. 25, 2015.

(60) Provisional application No. 62/423,402, filed on Nov. 17, 2016, provisional application No. 62/358,026, filed on Jul. 3, 2016, provisional application No. 62/207,234, filed on Aug. 19, 2015, provisional application No. 62/187,470, filed on Jul. 1, 2015, provisional application No. 62/140,032, filed on Mar. 30, 2015, provisional application No. 62/120,618, filed on Feb. 25, 2015, provisional application No. 62/117,808, filed on Feb. 18, 2015, provisional application No. 62/113,393, filed on Feb. 7, 2015, provisional application No. 62/069,360, filed on Oct. 28, 2014, provisional application No. 62/067,505, filed on Oct. 23, 2014, provisional application No. 62/066,718, filed on Oct. 21, 2014, provisional application No. 62/012,403, filed on Jun. 15, 2014, provisional application No. 61/991,505, filed on May 10, 2014, provisional application No. 61/970,885, filed on Mar. 26, 2014.

(51) Int. Cl.
*H04L 29/08* (2006.01)
*G06Q 50/00* (2012.01)
*H04L 29/06* (2006.01)
*G06F 9/451* (2018.01)
*G06N 20/00* (2019.01)
*G06Q 10/10* (2012.01)
*G06F 3/0484* (2013.01)

(52) U.S. Cl.
CPC ........... *G06N 20/00* (2019.01); *G06Q 10/101* (2013.01); *G06Q 50/01* (2013.01); *H04L 65/1066* (2013.01); *H04L 67/12* (2013.01); *H04L 67/141* (2013.01); *H04L 67/147* (2013.01); *H04L 67/22* (2013.01); *H04L 67/325* (2013.01)

(56) References Cited

U.S. PATENT DOCUMENTS

| | | |
|---|---|---|
| 7,489,979 B2 | 2/2009 | Rosenberg |
| 7,542,816 B2 | 6/2009 | Rosenberg |
| 7,562,117 B2 | 7/2009 | Rosenberg |
| 7,603,414 B2 | 10/2009 | Rosenberg |
| 7,917,148 B2 | 3/2011 | Rosenberg |
| 7,937,285 B2 | 5/2011 | Goldberg |
| 8,176,101 B2 | 5/2012 | Rosenberg |
| 8,745,104 B1 | 6/2014 | Rosenberg |
| 8,762,435 B1 | 6/2014 | Rosenberg |
| 2002/0171690 A1 | 11/2002 | Fox |
| 2003/0065604 A1 | 4/2003 | Gatto |
| 2005/0168489 A1 | 8/2005 | Ausbeck |
| 2005/0218601 A1 | 10/2005 | Capellan |
| 2006/0147890 A1 | 7/2006 | Bradford |
| 2006/0200401 A1 | 9/2006 | Lisani |
| 2006/0250357 A1 | 11/2006 | Safai |
| 2007/0099162 A1 | 5/2007 | Sekhar |
| 2007/0124503 A1 | 5/2007 | Ramos |
| 2008/0103877 A1 | 5/2008 | Gerken |
| 2009/0037355 A1 | 2/2009 | Brave |
| 2009/0063379 A1 | 3/2009 | Kelly |
| 2009/0063991 A1 | 3/2009 | Baron |
| 2010/0169144 A1 | 7/2010 | Estill |
| 2010/0299616 A1 | 11/2010 | Chen |
| 2011/0087687 A1 | 4/2011 | Immaneni |
| 2011/0119048 A1 | 5/2011 | Shaw |
| 2012/0011006 A1 | 1/2012 | Schultz |
| 2012/0079396 A1 | 3/2012 | Neer |
| 2012/0109883 A1 | 5/2012 | Iordanov |
| 2012/0290950 A1 | 11/2012 | Rapaport |
| 2013/0041720 A1 | 2/2013 | Spires |
| 2013/0231595 A1 | 9/2013 | Zoss |
| 2013/0311904 A1 | 11/2013 | Tien |
| 2014/0108915 A1 | 4/2014 | Lu |
| 2014/0162241 A1 | 6/2014 | Morgia |
| 2014/0249889 A1 | 9/2014 | Park |
| 2014/0258970 A1 | 9/2014 | Brown |
| 2014/0279625 A1 | 9/2014 | Carter |
| 2014/0379439 A1 | 12/2014 | Sekhar |
| 2015/0170050 A1 | 6/2015 | Price |
| 2015/0331601 A1 | 11/2015 | Rosenberg |

FOREIGN PATENT DOCUMENTS

| | | |
|---|---|---|
| KR | 101273535 | 6/2013 |
| WO | 2014023432 | 1/2014 |
| WO | 2014190351 | 11/2014 |

OTHER PUBLICATIONS

Beni; "From Swarm Intelligence to Swarm Robotics"; Swarm Robotics WS 2004, LNCS 3342; pp. 1-9; 2005.
Cuthbertson; "Artificial Intelligence Turns $20 into $11,000 in Kentucky Derby Bet"; Newsweek Tech & Science; http://www.newsweek.com/artificial-intelligence-turns-20-11000-kentucky-derby-bet-457783; May 10, 2016; 9 pages.
Cuthbertson; "Oscar Predictions: AI Calculates Leonardo DiCaprio Will Finally Get His Oscar"; Newsweek Tech & Science; http://www.newsweek.com/oscar-predictions-artificial-intelligence-predicts-leo-will-finally-get-his-430712; Feb. 26, 2016; 3 pages.
Cuthbertson; "Swarm Intelligence: AI Algorithm Predicts the Future"; Newsweek Tech & Science; http://www.newsweek.com/swarm-intelligence-ai-algorithm-predicts-future-418707; Jan. 25, 2016; 4 pages.
Deck et al; "Prediction Markets in the Laboratory"; University of Arkansas and Chapman University; J. Econ. Surv., 2013; 33 pages.
Deneubourg et al; "Collective Patterns and Decision-Making"; Ethology Ecology & Evolution; Mar. 22, 1989; pp. 295-311.

(56) References Cited

OTHER PUBLICATIONS

EP; Extended European Search Report for EP Application No. 15767909.3 mailed from the European Patent Office dated Sep. 4, 2017.
Gauchou et al; "Expression of Nonconscious Knowledge via Ideomotor Actions"; Consciousness and Cognition; Jul. 28, 2011; 9 pages.
Green; "Testing and Quantifying Collective Intelligence"; Collective Intelligence 2015; May 31, 2015; 4 pages.
Hanson et al; "Information Aggregation and Manipulation in an Experimental Market"; Interdisciplinary Center for Economic Science, George Mason University; Jul. 12, 2005; 15 pages.
Herkewitz; "Upvotes, Downvotes, and the Science of the Reddit Hivemind"; Aug. 8, 2013; http://www.popularmechanics.com/science/health/a9335/upvotes-downvotes-and-the-scien . . . ; downloaded Mar. 25, 2015; 10 pages.
International Search Report and Written Opinion of the International Searching Authority for PCT/US2015/022594 dated Jun. 29, 2015.
Malone et al; "Harnessing Crowds: Mapping the Genome of Collective Intelligence"; MIT Center for Collective Intelligence; Feb. 2009; 20 pages.
Meyer; "Meet Loomio, The Small-Scale Decision-Making Platform With the Biggest Ambitions"; Mar. 13, 2014; https://gigaom.com/2014/03/13/meet-loomio-the-small-scale-decision-making-platform-wi . . . ; downloaded Mar. 25, 2015; 11 pages.
PCT; International Search Report and Written Opinion of the International Searching Authority for PCT/US2015/035694 dated Aug. 28, 2015.
PCT; International Search Report and Written Opinion of the International Searching Authority for PCT/US2015/56394 dated Feb. 4, 2016.
PCT; International Search Report and Written Opinion of the International Searching Authority for PCT/US2016/040600 dated Nov. 29, 2016.
PCT; International Search Report and Written Opinion of the International Searching Authority for PCT/US2017/040480 dated Oct. 23, 2017.
Rand et al; "Dynamic Social Networks Promote Cooperation in Experiments with Humans"; PNAS; Nov. 29, 2011; vol. 108, No. 48; pp. 19193-19198.
Robertson; "After Success of Mob-Run 'Pokemon', Twitch Bets on Turning Viewers Into 'Torture Artists' Streaming Game Platform Helps Fund 'Choice Chamber', Where the Chat Window Sets the Challenges"; The Verge; Apr. 16, 2014; http://www.theverge.com/2014/4/16/5618334/twitch-streaming-platform-funds-viewer-con . . . ; downloaded Mar. 25, 2015; 4 pages.
Rosenberg et al; "Amplifying Prediction Accuracy Using Swarm A. I."; Intelligent Systems Conference 2017; Sep. 7, 2017; 5 pages.
Rosenberg et al; "Crowds vs. Swarms, A Comparison of Intelligence"; IEEE; Oct. 21, 2016; 4 pages.
Rosenberg; "Artificial Swarm Intelligence vs. Human Experts"; Neural Networks (IJCNN); 2016 International Joint Conference on IEEE; Jul. 24, 2016; 5 pages.
Rosenberg; "Artificial Swarm Intelligence, a human-in-the-loop approach to A. I."; Association for the Advancement of Artificial Intelligence; Feb. 12, 2016; 2 pages.
Rosenberg; "Human Swarming and The Future of Collective Intelligence"; Singularity WebLog; https://www.singularityweblog.com/human-swarming-and-the-future-of-collective-intelligence/; Jul. 19, 2015; 7 pages.
Rosenberg; "Human Swarming, a real-time method for Parallel Distributed Intelligence"; Proceedings of IEEE, 2015 Swarm/Human Blended Intelligence; Sep. 28, 2015; 7 pages.
Rosenberg; "Human Swarms Amplify Accuracy in Honesty Detection"; Collective Intelligence 2017; Jun. 15, 2017; 5 pages.
Rosenberg; "Human Swarms, A Real-Time Method for Collective Intelligence"; Proceedings of the European Conference on Artificial Life 2015; Jul. 20, 2015; pp. 658-659.
Rosenberg; "Human Swarms, a real-time method for collective intelligence"; Proceedings of the European Conference on Artificial Life; Jul. 2015; pp. 658-659.
Rosenberg; "Monkey Room Book One"; Outland Pictures; Amazon ebook; Jan. 15, 2014; 39 pages.
Rosenberg; "Monkey Room Book Three"; Outland Pictures; Amazon ebook; Feb. 20, 2014; 22 pages.
Rosenberg; "Monkey Room Book Two"; Outland Pictures; Amazon ebook; Feb. 9, 2014; 27 pages.
Rosenberg; "Monkey Room"; Outland Pictures; Amazon; Mar. 30, 2014; 110 pages.
Rosenberg; "New Hope for Humans in an A. I. World"; TEDxKC—You Tube; Sep. 7, 2017; http://www.youtube.com/watch?v=EuRyZT_Uas.
Rosenberg; U.S. Appl. No. 14/668,970, filed Mar. 25, 2015.
Rosenberg; U.S. Appl. No. 14/708,038, filed May 8, 2015.
Rosenberg; U.S. Appl. No. 14/738,768, filed Jun. 12, 2015.
Rosenberg; U.S. Appl. No. 14/859,035, filed Sep. 18, 2015.
Rosenberg; U.S. Appl. No. 14/920,819, filed Oct. 22, 2015.
Rosenberg; U.S. Appl. No. 14/925,837, filed Oct. 28, 2015.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.
Rosenberg; U.S. Appl. No. 15/086,034, filed Mar. 30, 2016.
Rosenberg; U.S. Appl. No. 15/199,990, filed Jul. 1, 2016.
Rosenberg; U.S. Appl. No. 15/241,340, filed Aug. 19, 2016.
Rosenberg; U.S. Appl. No. 15/640,145, filed Jun. 30, 2017.
Salminen; "Collective Intelligence in Humans: A Literature Review"; Lappeenranta University of Technology, Lahti School of Innovation; 1Proceedings; 2012; 8 pages.
Souppouris; "Playing 'Pokemon' with 78,000 People is Frustratingly Fun"; The Verge; Feb. 17, 2014; http://www.theverge.com/2014/2/17/5418690/play-this-twitch-plays-pokemon-crowdsource . . . ; downloaded Mar. 25, 2015; 3 pages.
Stafford; "How the Ouija Board Really Moves"; BBC Future; Jul. 30, 2013; http://www.bbc.com/future/story/20130729-what-makes-the-ouija-board-move; downloaded Mar. 25, 2015; 5 pages.
Surowiecki; "The Wisdom of Crowds—Why the Many Are Smarter Than the Few and How Collective Wisdom Shapes Business, Economies, Societies, and Nations"; Business Book Review; vol. 21, No. 43; 2006; 10 pages.
Unanimous A. I.; "What is Swarm Intelligence"; 2015; http://unu.ai/swarm-intelligence/; downloaded Oct. 6, 2016; 3 pages.
USPTO; Non-Final Office Action for U.S. Appl. No. 14/738,768 dated Sep. 8, 2017.
USPTO; Non-Final Office Action for U.S. Appl. No. 16/668,970 dated Aug. 15, 2017.
Wikipedia; "Swarm (simulation)"; Jul. 22, 2016; http://en.wikipedia.org/wiki/Swarm_(simulation); downloaded Oct. 6, 2016; 2 pages.
Wikipedia; "Swarm intelligence"; Aug. 31, 2016; http://en.wikipedia.org/wiki/Swarm_intelligence; downloaded Oct. 6, 2016; 8 pages.
Yeung et al.; "Metacognition in human decision-making: confidence and error monitoring"; Philosophical Transactions of the Royal Society B; 2012; pp. 1310-1321.

SYSTEMS AND METHODS FOR HYBRID SWARM INTELLIGENCE

This application claims the benefit of U.S. Provisional Application No. 62/423,402 entitled SYSTEM AND METHOD FOR HYBRID SWARM INTELLIGENCE, filed Nov. 17, 2016, which is incorporated in its entirety herein by reference.

This application is a continuation-in-part of U.S. application Ser. No. 14/668,970 entitled METHODS AND SYSTEMS FOR REAL-TIME CLOSED-LOOP COLLABORATIVE INTELLIGENCE, filed Mar. 25, 2015, which in turn claims the benefit of U.S. Provisional Application 61/970,885 entitled METHOD AND SYSTEM FOR ENABLING A GROUPWISE COLLABORATIVE CONSCIOUSNESS, filed Mar. 26, 2014, both of which are incorporated in their entirety herein by reference.

This application is a continuation-in-part of U.S. application Ser. No. 14/708,038 entitled MULTI-GROUP METHODS AND SYSTEMS FOR REAL-TIME MULTI-TIER COLLABORATIVE INTELLIGENCE, filed May 8, 2015, which in turn claims the benefit of U.S. Provisional Application 61/991,505 entitled METHODS AND SYSTEM FOR MULTI-TIER COLLABORATIVE INTELLIGENCE, filed May 10, 2014, both of which are incorporated in their entirety herein by reference.

This application is a continuation-in-part of U.S. application Ser. No. 14/738,768 entitled INTUITIVE INTERFACES FOR REAL-TIME COLLABORATIVE INTELLIGENCE, filed Jun. 12, 2015, which in turn claims the benefit of U.S. Provisional Application 62/012,403 entitled INTUITIVE INTERFACE FOR REAL-TIME COLLABORATIVE CONTROL, filed Jun. 15, 2014, both of which are incorporated in their entirety herein by reference.

This application is a continuation-in-part of U.S. application Ser. No. 14/859,035 entitled SYSTEMS AND METHODS FOR ASSESSMENT AND OPTIMIZATION OF REAL-TIME COLLABORATIVE INTELLIGENCE SYSTEMS, filed Sep. 18, 2015 which in turn claims the benefit of U.S. Provisional Application No. 62/066,718 entitled SYSTEM AND METHOD FOR MODERATING AND OPTIMIZING REAL-TIME SWARM INTELLIGENCES, filed Oct. 21, 2014, both of which are incorporated in their entirety herein by reference.

This application is a continuation-in-part of U.S. application Ser. No. 14/920,819 entitled SUGGESTION AND BACKGROUND MODES FOR REAL-TIME COLLABORATIVE INTELLIGENCE SYSTEMS, filed Oct. 22, 2015 which in turn claims the benefit of U.S. Provisional Application No. 62/067,505 entitled SYSTEM AND METHODS FOR MODERATING REAL-TIME COLLABORATIVE DECISIONS OVER A DISTRIBUTED NETWORKS, filed Oct. 23, 2014, both of which are incorporated in their entirety herein by reference.

This application is a continuation-in-part of U.S. application Ser. No. 14/925,837 entitled MULTI-PHASE MULTI-GROUP SELECTION METHODS FOR REAL-TIME COLLABORATIVE INTELLIGENCE SYSTEMS, filed Oct. 28, 2015 which in turn claims the benefit of U.S. Provisional Application No. 62/069,360 entitled SYSTEMS AND METHODS FOR ENABLING AND MODERATING A MASSIVELY-PARALLEL REAL-TIME SYNCHRONOUS COLLABORATIVE SUPER-INTELLIGENCE, filed Oct. 28, 2014, both of which are incorporated in their entirety herein by reference.

This application is a continuation-in-part of U.S. application Ser. No. 15/017,424 entitled ITERATIVE SUGGESTION MODES FOR REAL-TIME COLLABORATIVE INTELLIGENCE SYSTEMS, filed Feb. 5, 2016 which in turn claims the benefit of U.S. Provisional Application No. 62/113,393 entitled SYSTEMS AND METHODS FOR ENABLING SYNCHRONOUS COLLABORATIVE CREATIVITY AND DECISION MAKING, filed Feb. 7, 2015, both of which are incorporated in their entirety herein by reference.

This application is a continuation-in-part of U.S. application Ser. No. 15/047,522 entitled SYSTEMS AND METHODS FOR COLLABORATIVE SYNCHRONOUS IMAGE SELECTION, filed Feb. 18, 2016 which in turn claims the benefit of U.S. Provisional Application No. 62/117,808 entitled SYSTEM AND METHODS FOR COLLABORATIVE SYNCHRONOUS IMAGE SELECTION, filed Feb. 18, 2015, both of which are incorporated in their entirety herein by reference.

This application is a continuation-in-part of U.S. application Ser. No. 15/052,876 entitled DYNAMIC SYSTEMS FOR OPTIMIZATION OF REAL-TIME COLLABORATIVE INTELLIGENCE, filed Feb. 25, 2016 which in turn claims the benefit of U.S. Provisional Application No. 62/120,618 entitled APPLICATION OF DYNAMIC RESTORING FORCES TO OPTIMIZE GROUP INTELLIGENCE IN REAL-TIME SOCIAL SWARMS, filed Feb. 25, 2015, both of which are incorporated in their entirety herein by reference.

This application is a continuation-in-part of U.S. application Ser. No. 15/086,034 entitled SYSTEM AND METHOD FOR MODERATING REAL-TIME CLOSED-LOOP COLLABORATIVE DECISIONS ON MOBILE DEVICES, filed Mar. 30, 2016 which in turn claims the benefit of U.S. Provisional Application No. 62/140,032 entitled SYSTEM AND METHOD FOR MODERATING A REAL-TIME CLOSED-LOOP COLLABORATIVE APPROVAL FROM A GROUP OF MOBILE USERS filed Mar. 30, 2015, both of which are incorporated in their entirety herein by reference.

This application is a continuation-in-part of U.S. application Ser. No. 15/199,990 entitled METHODS AND SYSTEMS FOR ENABLING A CREDIT ECONOMY IN A REAL-TIME COLLABORATIVE INTELLIGENCE, filed Jul. 1, 2016, which in turn claims the benefit of U.S. Provisional Application No. 62/187,470 entitled METHODS AND SYSTEMS FOR ENABLING A CREDIT ECONOMY IN A REAL-TIME SYNCHRONOUS COLLABORATIVE SYSTEM filed Jul. 1, 2015, both of which are incorporated in their entirety herein by reference.

This application is a continuation-in-part of U.S. application Ser. No. 15/241,340 entitled METHODS FOR ANALYZING DECISIONS MADE BY REAL-TIME INTELLIGENCE SYSTEMS, filed Aug. 19, 2016, which in turn claims the benefit of U.S. Provisional Application No. 62/207,234 entitled METHODS FOR ANALYZING THE DECISIONS MADE BY REAL-TIME COLLECTIVE INTELLIGENCE SYSTEMS filed Aug. 19, 2015, both of which are incorporated in their entirety herein by reference.

This application is a continuation-in-part of U.S. application Ser. No. 15/640,145 entitled METHODS AND SYSTEMS FOR MODIFYING USER INFLUENCE DURING A COLLABORATIVE SESSION OF REAL-TIME COLLABORATIVE INTELLIGENCE SYSTEM, filed Jun. 30, 2017, which in turn claims the benefit of U.S. Provisional Application No. 62/358,026 entitled METHODS AND SYSTEMS FOR AMPLIFYING THE INTELLIGENCE OF A HUMAN-BASED ARTIFICIAL SWARM INTELLI- GENCE filed Jul. 3, 2016, both of which are incorporated in their entirety herein by reference.

This application is a continuation-in-part of International Application No. PCT/US15/22594, filed Mar. 25, 2015.

This application is a continuation-in-part of International Application No. PCT/US15/35694, filed Jun. 12, 2015.

This application is a continuation-in-part of International Application No. PCT/US15/56394, filed Oct. 20, 2015.

This application is a continuation-in-part of International Application No. PCT/US16/40600, filed Jul. 1, 2016.

This application is a continuation-in-part of International Application No. PCT/US17/40480, filed Jun. 30, 2017.

BACKGROUND OF THE INVENTION

1. Field of the Invention

The present invention relates generally to systems and methods for collaborative intelligence, and more specifically to systems and methods for closed-loop, dynamic collaborative intelligence.

2. Discussion of the Related Art

Distributed computing devices, such as personal computers, and media players have become ubiquitous due to their interactivity with existing computer networks and their ability to pass information to other portable computing devices and/or to centralized servers through phone networks, wireless networks and/or through local spontaneous networks such as Bluetooth® networks. Many of these devices also provide the ability to store and display media, such as songs, videos, podcasts, ebooks, maps, and other related content and/or programming. Many of these devices are also used as navigation tools, including GPS functionality. Many of these devices are also used as personal communication devices, enabling phone, text, picture, and video communication with other similar portable devices. Many of these devices include touch screens, tilt interfaces, voice recognition, and other modern user input modes. As a result, the general social trend within industrial societies is that every person does now or soon will maintain at least one such multi-purpose electronic device upon their person at most times, especially when out and about.

While such devices allow accessing information and person to person communication, they do not provide any unique tools and infrastructure that specifically enable groups of electronically networked individuals to have a real-time group-wise experience that evokes the group's collaborative intent and intelligence (Collaborative Consciousness). Natural systems such as flocks of birds, schools of fish and swarms of bees have evolved powerful methods to combine diverse input from large groups of individuals and produce highly optimized decisions. Referred to as Swarm Intelligence, these natural organisms achieve this remarkable feat by forming real-time close-loop systems that converge on optimized solutions.

Hence, there is a substantial need to provide tools and methods by which groups of individuals, each having a computing device local to their person, to more easily contribute their personal will/intent to an emerging collaborative consciousness, allowing the group to collectively answer questions or otherwise express their groupwise will in real-time (i.e. through "swarm intelligence"). Furthermore, there is a need to provide tools and methods that enable groups of users to be informed of the group-wise will that is emerging in real-time. Additionally, there is a need to incorporate machine learning/artificial intelligence into the swarm intelligence in order to augment the input from human users using additional data.

The present invention, as described herein, addresses these and other deficiencies present in the art.

SUMMARY OF THE INVENTION

Several embodiments of the invention advantageously address the needs above as well as other needs by providing a hybrid intelligence system for enabling human participants and machine agents to converge on an answer to a question together as a real-time dynamic system during a group collaboration session, the system comprising: a central server in networked communication with a plurality of computing devices; a software-controlled pointer for selecting an answer from a set of answer choices, the selection based at least in part upon a simulated spatial location of the pointer in a simulated software environment; a plurality of simulated target locations in the simulated software environment, each of the plurality of target locations being associated with an answer choice of the set of answer choices; a plurality of time-varying user input values, wherein each computing device is configured to determine user input values based on user input and send the user input values to the central server, wherein each time-varying user input value represents the user's desired motion of the software controlled pointer with respect to the plurality of target location across a plurality of time steps during the group collaboration session; and at least one time-varying machine agent value received by the central server, the at least one machine agent value representing a desired motion of the software controlled pointer with respect to the plurality of target locations across the plurality of time steps, wherein the at least one machine agent value is determined using at least one pre-determined rule, wherein the central server is configured to update the simulated spatial location of the software-controlled pointer with respect to the plurality of simulated target locations in the simulated software environment based at least in part upon the plurality of time-varying user input values and the at least one machine agent value, whereby the answer is determined during the collaboration session based at least on part upon an elapsed time and a relative location of the software-controlled pointer to at least one simulated target location.

In another embodiment, the invention can be characterized as a method for enabling human participants and machine agents to converge on an answer to a question together as a real-time dynamic system during a group collaboration session comprising: sending of initial session information including a set of answer choices, each answer choice associated with one of a set of simulated target locations, from a central server to a plurality of computing devices in communication with the central server; sending, repeatedly in real-time during the session, of a user input value from each computing device to the server in response to user input, wherein each time-varying user input value represents the user's desired motion of the software controlled pointer with respect to the plurality of target locations across a plurality of time steps during the group collaboration session; sending to the central server, repeatedly in real-time during the session, of at least one machine agent value from an agent application in communication with the central server, the at least one machine agent value representing a desired motion of the software controlled pointer with respect to the plurality of target locations across the plurality of time steps, wherein the at least one machine agent value is determined using at least one pre-determined rule; and updating by the central server, repeatedly in real-time during the session, the simulated spatial location of the software-controlled pointer with respect to the plurality of simulated target locations in the simulated software environment based at least in part upon the plurality of time-varying user input values and the at least one machine agent value, whereby the answer is determined during the collaboration session based at least on part upon an elapsed time and a relative location of the software-controlled pointer to at least one simulated target location.

In yet another embodiment, the invention can be characterized as a hybrid machine intelligence method using a machine intelligence system and human scouts, the method comprising: providing a central forecasting server in communication with a plurality of computing devices, each of the plurality of computing devices running a scouting application for use by a human user; sending a forecasting query from the central forecasting server to each of the plurality of computing devices, the forecasting query indicating a forecasting question to be researched by the human user of the computing device by searching the internet; enabling the human user of each computing device to search the internet in response to the forecasting query received from the forecasting server while recording tracking data as the human user accesses web-based documents responsive to the query; enabling the human user of each computing device to provide evaluation data regarding the web-based documents accessed by the user in response to the forecasting query, the evaluation data including an indication of at least one of importance, bent, and validity of each document accessed; sending to the forecasting server, from each computing device, scouting data regarding the web-based documents accessed by the human user including the tracking data and the evaluation data; and analyzing, by the forecasting server, the scouting data from the plurality of human users in response to the forecasting query to produce a machine forecast, said machine forecast providing a set of probabilities regarding the likelihood of each of a plurality of possible outcomes related to the forecasting query.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
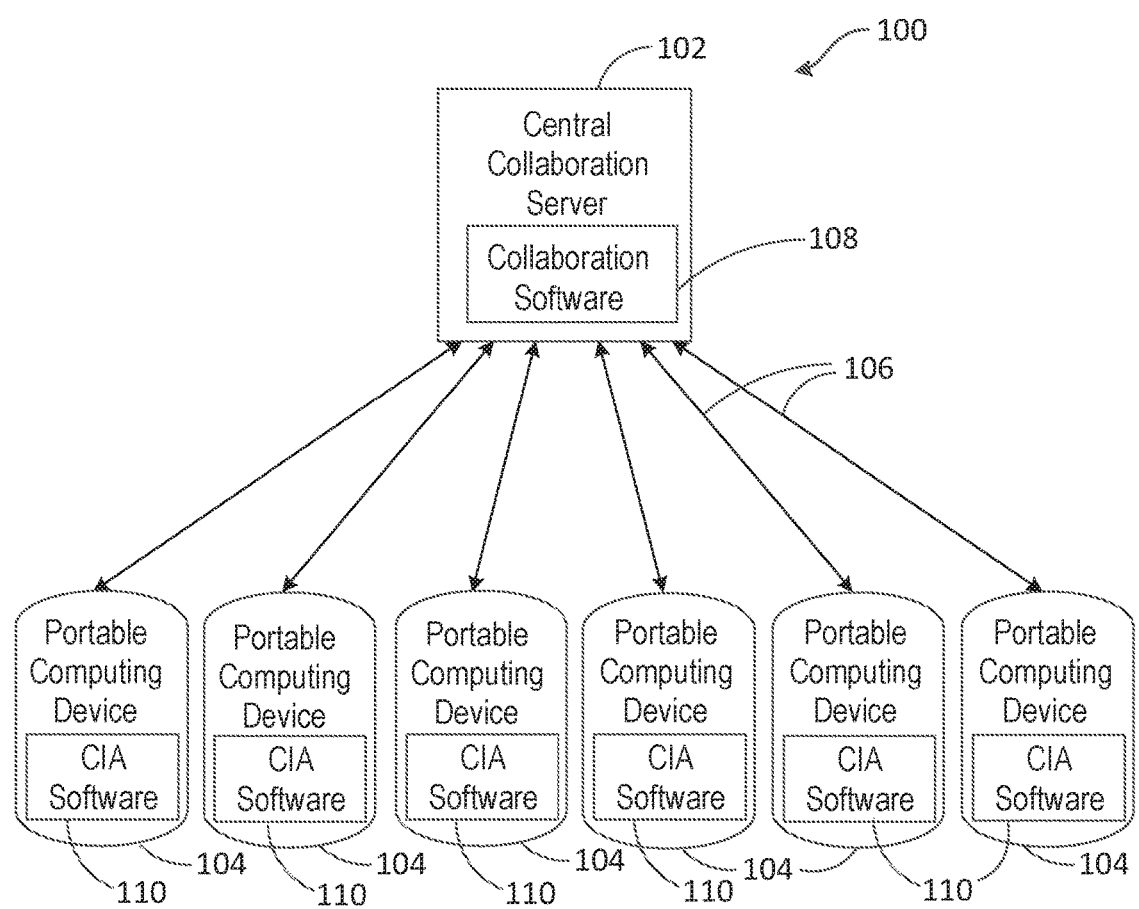
FIG. 1 is a schematic diagram of an exemplary real-time collaborative system in one embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

As referred to in this specification, "media items" refers to video, audio, streaming and any combination thereof. In addition, the audio subsystem is envisioned to optionally include features such as graphic equalization, volume, balance, fading, base and treble controls, surround sound emulation, and noise reduction. One skilled in the relevant art will appreciate that the above cited list of file formats is not intended to be all inclusive.

Real-time occurrences as referenced herein are those that are substantially current within the context of human perception and reaction.

Referred to as Artificial Swarm Intelligence, systems created by Unanimous A.I. enable groups of networked people to answer question, make predictions, and offer opinions by working as a unified system. This has been shown to amplify intelligence, producing better predictions and decisions than the individuals can produce alone. As described in co-pending patent application Ser. No. 14/668,970, which is hereby incorporated by reference, a system and methods have been developed that allows a group of users to collaboratively control the motion of a graphical pointer through a unique group-wise control paradigm. In some embodiments, the collaboratively controlled pointer is configured to allow a group of users to choose letters, words, and/or numbers in response to a prompt posed to the group. This enables the formation a group response that's not based on the will of any individual user, but rather based on the collective will of the group. In some embodiments, the group response comprises a set of letters, numbers, and/or words that form a textual reply to a question or statement posed to the group. In this way, the system disclosed herein enables a group of people to verbally communicate as a single collective intelligence. In some embodiments, the group response may comprise a task performed in response to a prompt, for example the collaborative control of a pointer to draw a picture as a group. We refer to such a collective intelligence herein as a "swarm A.I." for it's an artificial intellect that emerges from the group as a result of unique computer-moderated methods employed herein.

As described in co-pending patent application Ser. No. 14/708,038, which is hereby incorporated by reference, additional systems and methods were disclosed that encourage groups of real-time users who are collaboratively answering questions by controlling a pointer, to produce coherent responses while discouraging incoherent responses. A number of methods were disclosed therein, including (a) Coherence Scoring, (b) Coherence Feedback, and (c) Tiered Processing. These and other techniques greatly enhance the effectiveness of Group-wise Collaborative Control, incentivizing participants to convey their individual will in a more collaborative and coherent manner. By promoting greater collaboration among members of a real-time group, the result a more focused "swarm intelligence" that produces more coherent answers in shorter amounts of time.

As described in co-pending patent application Ser. No. 14/738,768, which is hereby incorporated by reference, systems and additional novel methods were disclosed that provide additional novel systems and methods for user interfacing that make group-wise collaborative control more intuitive for the participating users. More specifically, novel systems and methods were disclosed that enable individual users to intuitively impart their own personal intent upon a graphical pointer that's being collaboratively controlled through real-time synchronous input collected from a plurality of users. Some disclosed embodiments support users interfacing with a mouse, touchpad, trackball, or touchscreen. Other embodiments support users interfacing by tilting a mobile computing device such as a phone or tablet. Some preferred methods employ a manipulatable graphical magnet such that each user positions the magnet so as to impart a simulated pull on the group-wise pointer. The sum (or average) of a plurality of user's individual pulls are then used to influence the group-wise motion of the pointer, thus providing a physically intuitive control paradigm. This and other novel solutions disclosed therein, solved the unique problems posed by enabling real-time synchronous collaborative control of a group-wise pointer, thus enabling more effective "swarm intelligence" systems.

Also disclosed were methods and systems to enable individual users to quickly and easily pose questions to a collaborating group. As described in the co-pending applications, the moderating collaboration software 108 can be configured to orchestrate which users can ask questions to the group and when. Once a question is asked, it can be answered through a collaborative control methods in which the pointer is enabled to select one of a predefined set of answers (such as YES, NO, MAYBE, PROBABLY, DOUBTFUL) and/or by select a set of alphanumeric characters. While such methods are highly effective, additional methods were disclosed herein that also allows individuals to specify a set of custom choices (i.e. possible answers) when asking a question to the group. The custom choices are then displayed graphically to the group as spatially arranged elements. The users can then collaboratively select among the spatially arranged elements using the group-wise pointer. This allows for "bounded-set questions" to be asked in a fast and fun manner, making the overall user experience far more enjoyable and efficient. This and other question-asking methods will be described in detail later in this document.

Also disclosed were innovative hosting methods, allowing large numbers of users to login and participate in collaborative experiences. More specifically, a novel paradigm was disclosed that allows groups of users to enter one of a plurality of on online collaboration groups (referred to herein as swarms) and participate in question/answer sessions. Users can choose among a plurality of swarms, some being public (for groups of strangers), other being private (for groups of friends). The swarms can be general or themed, such that themed swarms are for questions on a particular topic. In some embodiments, swarms can compete with other swarms, bringing the real-time synchronous methods disclosed herein to a higher order, creating a group comprised of groups (i.e. a swarm of swarms). Also disclosed were methods of giving swarms their own unique voice by enabling answers produced by synchronous groups of users to be tweeted (via TWITTER). This technology is the first known deployment of tweets from a consciousness comprised not of a single individual, but a swarm of individuals acting as emergent artificial intelligence.

As described in co-pending Provisional patent application Ser. No. 14/859,035, hereby incorporated by reference, a system and methods have been developed for enabling swarms of users to modify its configuration dynamically over time, optimizing the performance of the swarm intelligence by altering its population and/or the connection strength of members of that population. In some such embodiments the members of a swarm can selectively EJECT (i.e. banish) one or more low performing member of that swarm (from the swarm), using the group-wise collaborative decision-making techniques herein. In many such embodiments, "low performance" is determined by assessing a novel "synchrony value" for that user. If the sync-value is below a certain threshold, the collaboration software 108 poses a question to the group—asking for a collaborative decision as to whether the user should be banished from the swarm or not. If the group collectively agrees to EJECT a member, that member is ejected, no longer participating in the group-wise control of the graphical elements displayed. In some embodiments, the decision is binary (banish or not banish) in other embodiments, the group can be provided with other options, such as putting the low-performing member on "probation". If the user continues to perform poorly (with low "sync" values) during his or her probation period, he could be (a) automatically banished, or (b) banished upon another collaborative decision put to the members of the group. In some such embodiments an ejection threshold value is set by users such that if the sync value of an existing member (averaged across some number of prior trials) falls below the ejection threshold, that user is either (a) automatically banished, or (b) selectively banished based on real-time collaborative input from the swarm.

As also disclosed, swarms can be configured to dynamically adjust its own configuration, not by ejecting members of the swarm but by adjusting the relative weighting of the input received from members of the swarm. More specifically, in some embodiments, algorithms are used to increase the impact (weighting) that some users have upon the collective pull of the puck, while decreasing the impact (weighting that other users have upon the collective pull of the puck. More specifically, User Synchrony Values (also called User Synchronicity Values) are computed to reflect each user's contribution to (or resistance of) an emerging consensus in each trial. Users who show a time history of high "sync", have their weighting values increased by the underlying collaboration software 108, while users who show a time history of low "sync" have their weighting values decrease. In this way, the swarm intelligence is adapted over time by the underlying algorithms disclosed herein, strengthening the connections (i.e. input) with respect to the more collaborative users, and weakening the connections with respect to the less collaborative users. In this way, the collaborative swarm in controlled in a manner innovatively reminiscent of an adaptable neural network that optimizes its intelligence over time.

While the prior system described above enable human groups to amplify their collective intelligence and produce optimized predictions, forecasts, and decisions, what is needed is the ability to expand the power of Artificial Swarm Intelligence so it can include input not just from humans, but also from machine intelligence, working together as a unified system. Referred to herein as a Hybrid Swarm Intelligence, the present invention describes the system and methods required to build a real-time closed-loop Hybrid Swarm Intelligence that includes both human participants and machine participants, where the machine participants are driven by traditional A.I. methods. In this way, the present invention enables the creation of a Hybrid Swarm ("h-Swarm") that produces a unified emergent intelligence by combining insights from human participants and artificial intelligence participants.

As described in the previously mentioned co-pending provisional patent applications, an innovative real-time system has been developed that enables synchronous groups of users to form a coherent swarm intelligence that can collaboratively control a graphical element such as a pointer (or "puck") in order to collectively answer questions, make statements, take actions, select functions, or otherwise respond to prompts. Using the disclosed systems and methods, a "social swarming" platform is enabled that allows users to join one of a plurality of hosted swarms, collaborate with that swarm, earn scores and/or credits and/or rankings based on their performance with respect to others in the swarm, and browse the stored output from other swarms. In some embodiments, groups (i.e. swarms) can compete with other swarms, each of said swarms also earning group-wise scores, credits, and/or rankings with respect to other swarms.

Referring first to FIGS. 1-5, an exemplary collaboration system and associated exemplary graphical displays are shown for the computing device-server swarm intelligence embodiment as disclosed in the previously mentioned co-pending applications. The Hybrid Swarm Intelligence system is disclosed starting with FIG. 6.

Referring next to FIG. 1, a schematic diagram of an exemplary collaboration system 100 is shown. Shown are a Central Collaboration Server (CCS) 102, the plurality of portable computing devices 104, a plurality of exchanges of data with the Central Collaboration Server 106, a collaboration software 108, and a plurality of collaboration intent application software 110.

Embodiments of the plurality of portable computing devices 104 and the interaction of the computing devices 104 with the system 100 are previously disclosed in the related patent applications.

As shown in FIG. 1, the system 100 comprises the Central Collaboration Server (CCS) 102 in communication with the plurality of computing devices 104, each of said computing devices 104 running the Collaborative Intent Application software 108 ("CIA"). The system 100 is designed to enable the plurality of users, each engaging an interface of one of said computing devices 104, to jointly control a single graphical element, for example the movable pointer 210, through real-time group-wise collaboration. In some embodiments, such as a multi-tier architecture, the portable computing devices 104 may communicate with each other. The CCS 102 includes the collaboration software 108 and additional elements as necessary to perform the required functions. In this application, it will be understood that the term "CCS" may be used to refer to the collaboration software 108 or other elements of the CCS 102 that are performing the given function.

Although multiple pointers controlled by multiple swarms is enabled by the innovations of the present invention, for the current discussion we will give examples that are confined to a single swarm. This is for simplicity of description and is not intended to limit the scope of the innovations.

Referring again to FIG. 1, each of the computing devices 104 comprises one or more processors capable of running the CIA routines and displaying a representation of the pointer 210 along with a plurality of graphical input choices 208 (as shown below in FIG. 2, also referred to as "answer choices"). The computing device 104 could be, for example, a personal computer running the CIA 110. It could also be a mobile device such as a smart phone, tablet, headset, smart-watch, or other portable computing device running the CIA 110. The CIA 110 code can be configured as a stand-alone executable or be code that executes inside a web-browser or other shell.

While FIG. 1 shows only six computing devices 104 in communication with the CCS 102, the system 100 is highly scalable, enabling hundreds, thousands, or even millions of users to connect simultaneously to the CCS 102, each using their own computing device 104, thereby sharing a real-time collaborative experience with the other users. In this way, large numbers of users can collaboratively control the pointer 210 to generate a response by selecting letters, words, or numbers as a group intelligence.

While FIG. 1 shows simple top-down architecture for direct communication between the CCS 102 and each of the computing devices 104, related application Ser. No. 14/708,038 entitled MULTI-GROUP METHODS AND SYSTEMS FOR REAL-TIME MULTI-TIER COLLABORATIVE INTELLIGENCE discloses multi-group and tiered architectures that enable shared processing loads among large numbers of computing devices 104. While FIG. 1 shows a dedicated CCS 102, the system 100 can be configured such that one of the computing devices 104 acts as the CCS 102 by running both CCS routines and CIA routines. Such a model is generally viable only when the number of users is low. Regardless of the architecture used, each of said computing devices 104 that is engaged by a participating user includes one or more display devices for presenting a graphical user interface to the user.

Figure 2:
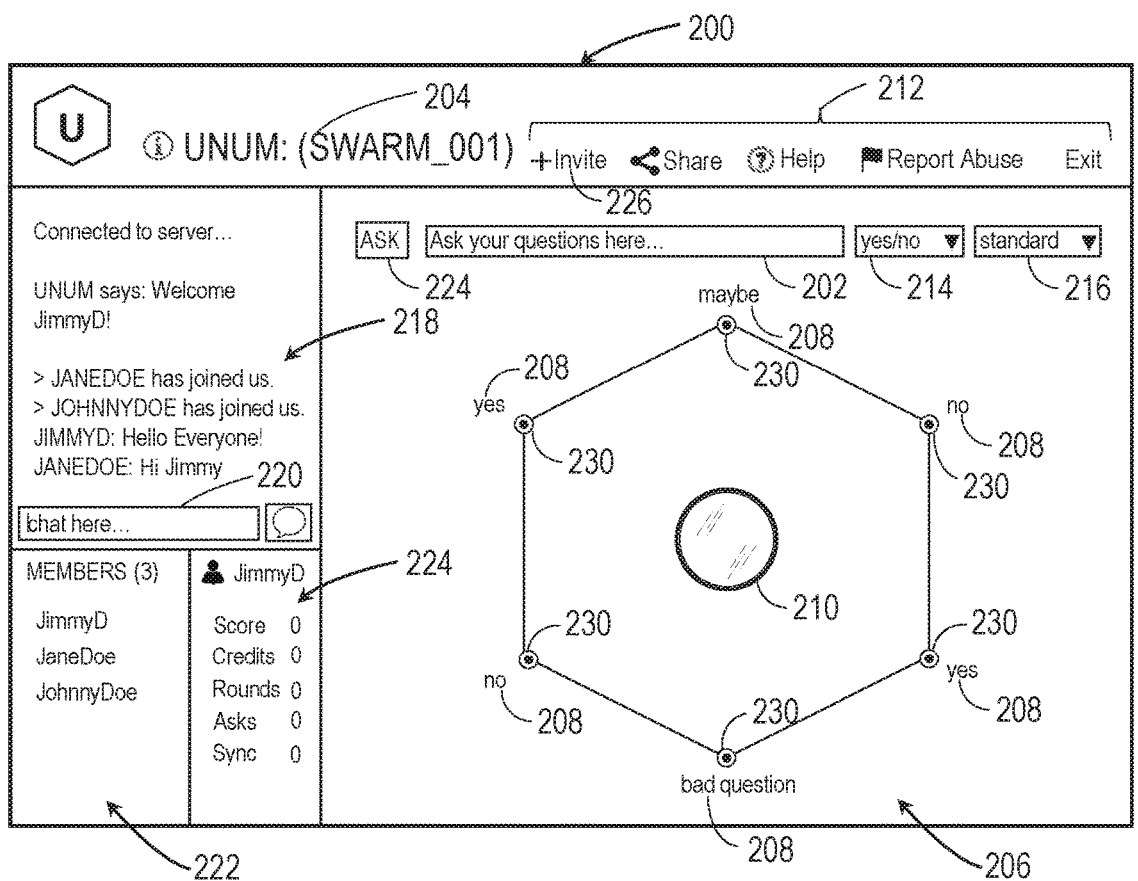
FIG. 2 is an exemplary display interface of a computing device of the collaborative system in accordance with one embodiment of the present invention.

Referring next to FIG. 2, an exemplary display interface 200 is shown in accordance with one embodiment of the present invention. Shown are a prompt bar 202, a group name 204, a target area 206, the plurality of input choices 208, the pointer 210, a communication menu 212, a board selection drop-down menu 214, a physics selection drop-down menu 216, a chat window 218, a chat input box 220, a current member list 222, a statistics display 224, an invite button 226, an ask button 228, and a plurality of target locations 230.

The graphical pointer 210 is simultaneously displayed to each user by the CIA 110 running on his computing device 104. The pointer 210 displayed to each user appears in a substantially similar position with respect to a set of target locations 230 (as compared to the position of the pointer 210 on other user's screens). Each target location 230 is associated with one input choice/answer choice 208. In the example of FIG. 2, the input choices 208 associated with the six target locations are "maybe", "no", "yes", "bad question", "no" and "yes". The synchrony of the interfaces is coordinated by the data 106 received by each computing device 104 sent from the CCS 102 over the communications link. In a current embodiment, data 106 is sent from the CCS 102 to each of the plurality of computing devices 104 at a rate of 60 updates per second, the data 106 including the current position of the graphical pointer 210 (also referred to as a puck) with respect to the set of graphical input choices 208, as further shown below.

In general, the input choices 208 and target locations 230 are identically displayed upon all the computing devices 104, although some unique embodiments allow for divergent input choices 208. For example, in some embodiments the input choices 208 are displayed in the native language of each user, each input choice 208 conveying a substantially similar verbal message, but translated based on a language setting of the user. This feature enables swarms of individuals who may speak different languages and may be unable to communicate directly, to still form a swarm intelligence that can collaboratively answer questions or take actions. In such embodiments, the displayed questions are also automatically translated into the chosen native language of the user. This is also true of a displayed answer, and optionally the chat window 218 output.

In some embodiments, multiple graphical pointers 210 are displayed by the computing devices 104, each of said graphical pointers 210 being collaboratively controlled by a different group of users. For example, 500 users may be collaboratively controlling Graphical Pointer #1, while a different group of 500 users are collaboratively controlling Graphical Pointer #2. The first group of 500 users comprises a first swarm. The second group of 500 users comprises a second swarm. This unique system and methods allow for the first swarm to compete with the second swarm in a task that is displayed simultaneously to all 1000 users on each of their computing devices 104.

As shown in FIG. 2, the CIA 110 running on each computing device 104 is configured to display a graphical display interface 200 that includes at least one graphical pointer 210, the plurality of spatially arranged graphical target locations 230, and the input choices 208, with one input choice 208 associated with each target location 230. In the example shown, the graphical pointer 210 is configured to look like a "glass puck" with a central viewing area that is transparent. In the example shown, the target locations 230 are configured as a hexagon of six target locations, each target location 230 including a graphical icon (in the embodiment shown, a dot inside a circle) and the word of the associated input choice 208. In this case, the six input choices 208 correspond with possible answers to questions: "Yes", "Maybe", "No", "Yes", "Bad Question", and "No". When the pointer 210 is positioned over one of the target locations 230 such that the target location 230 is substantially within a centralized viewing area of the pointer 210 for more than a threshold amount of time, the coresponding input choice 208 is selected as a target. In common embodiments the threshold amount of time is 3 to 5 seconds. In the current embodiment, the centralized viewing area appears as a graphical etching on the glass pointer 210, the etching remaining invisible until the pointer 210 approaches a target.

As shown in the exemplary embodiment of FIG. 2, the spatially arranged graphical input choices 208 can comprise letters, numbers, words, and/or punctuation marks. The input choices 208 could also comprise photographs. In this example, if the pointer 210 is positioned over one of the six target locations 230 for more than the threshold amount of time, that input choice 208 is selected as the answer to a previously asked question. The relative "locations" of the input choices 208 and the graphical pointer 210 can be described as simulated spatial locations in a simulated software environment, as the "locations" are generated and tracked by the software of the CCS 102.

To ask a question, the user enters the question into the prompt bar 202. Once entered, the user clicks the ask button 228, which sends the question from the CIA 110 of that particular user (running on his computing device 104) to the CCS 102. Because many users could ask questions, the CCS 102 acts as the gate keeper, deeming the first question received (when no question is currently in process) as the one that will be asked to the group. In the current embodiment, not all users are enabled to ask questions at any given time to avoid too much competition for asking. In some embodiments, credits are redeemable by the user for the right to ask the question. In some embodiments, the user must spend credits to ask the question, and can only ask if he has enough credits. In some embodiments, users earn credits based on points awarded for participation in a session. More credits are awarded to users who have high sync scores, less credits being awarded to users with low sync scores. The methods for computing sync scores will be described in more detail further below.

In addition to asking questions, users can select from a plurality of possible target boards by using the board selection drop-down menu 214. The currently selected target board is for yes/no questions. Other target boards may include true/false questions, good/bad questions, and other sets of standardized answers. Also, a spelling board may be included where a full alphabet of input choices 208 are displayed, allowing users to spell out answers (as shown in co-pending applications). The spelling board may also include numbers, punctuation, backspace, blank space, and other alphanumeric characters.

As disclosed in co-pending applications, custom boards can also be entered by selecting "custom" from the board selection drop-down menu 214. As will be disclosed further below, "suggestion mode" can also be selected for a given question through the board selection drop-down menu 214.

As also shown in FIG. 2, users can selectively use a physics mode from the physics selection drop-down menu 216. As shown, a standard physics mode has been selected, but users can choose ice mode where the pointer 210 slides around on the target board as if it were frictionless ice. A gravity mode is configured to pull the pointer 210 back to a location substantially near a center of the input choice set (i.e. center screen) as if by simulated gravity. In a heavy mode the pointer 210 has substantially higher mass than in standard mode and thus is harder for users to collectively move. In a barrier mode, a set of physical barriers block a direct path to the target locations 230, forcing users to collaboratively guide the pointer 210 around barriers to reach the target location 230.

As also shown in FIG. 2, the display interface 200 includes the chat window 218 that allows users to exchange messages by typing in the chat input box 220. Also included is the list of current members who are part of the group and thus enabled to ask questions and collaboratively provide control over the pointer 210.

Because users enter this group display interface 200 from a lobby display interface where the user can choose from among a plurality of available groups or swarms, the name of the current group (swarm) is also displayed. In addition, users can invite their friends to this group by clicking on the invite button 226 includes in the communication menu 212. In the current embodiments, these invites can leverage existing social networks such as Facebook® friends and Twitter® followers. Also included in the interface of the current embodiment is the statistics display 224 that gives the user of this instance of the software (on this computing device 104) a listing of his personal statistics including his score, credits, synchronicity value, the number of rounds he has participated in, and the number of questions he has asked the swarm.

When an exemplary question is entered by one of the users in the group, the question is sent by the CIA 110 on that user's computing device 104 to the CCS 102. If the CCS 102 software determines that the question is valid, the question is then sent to all the users in the group so that it appears substantially simultaneously on the display interface of each of the computing devices 104. In a current embodiment, the question appears in a large box at the top of the target board. Then a "3"-"2"-"1" countdown timer appears at the center of the target board, notifying users get ready for the collaborative answer process, or session, to begin. The display interface (having received instructions from the CCS 102) then displays a graphical "GO" and the users will then collaboratively control the motion of the pointer 210, guiding it towards whichever input choice 208 best satisfies the collaborative will of the group as emergent from the real-time swarm intelligence.

Each answer session is generally limited in total time by the underlying software of the present system 100, for example giving the swarm 60 seconds to converge upon an answer through the collaborative motion of the pointer 210. This time pressure is deliberate, for it inspires users to employ their gut instincts and intuitions rather than over-thinking the question.

To support the use of time-pressure, the countdown clock 304 is displayed on a group display interface 300 of each user (as shown below in FIG. 3), the timing of the plurality of countdown clocks 304 coordinated by handshaking signals from the CCS 102. If the pointer 210 does not reach the target within the allotted 60 seconds, the system 100 determines that the collaboration is a failure, and sends a failure indication to the CIA 110 of each computing device 104. In some embodiments, in response to receiving the failure indication the CIA 110 terminating user input and displaying the words "brain freeze!" on the group interface. In addition, in response to receiving the failure indication all users could lose a number of points and/or credits for the collective failure of the group to guide the pointer 210 to a target.

Figure 4:
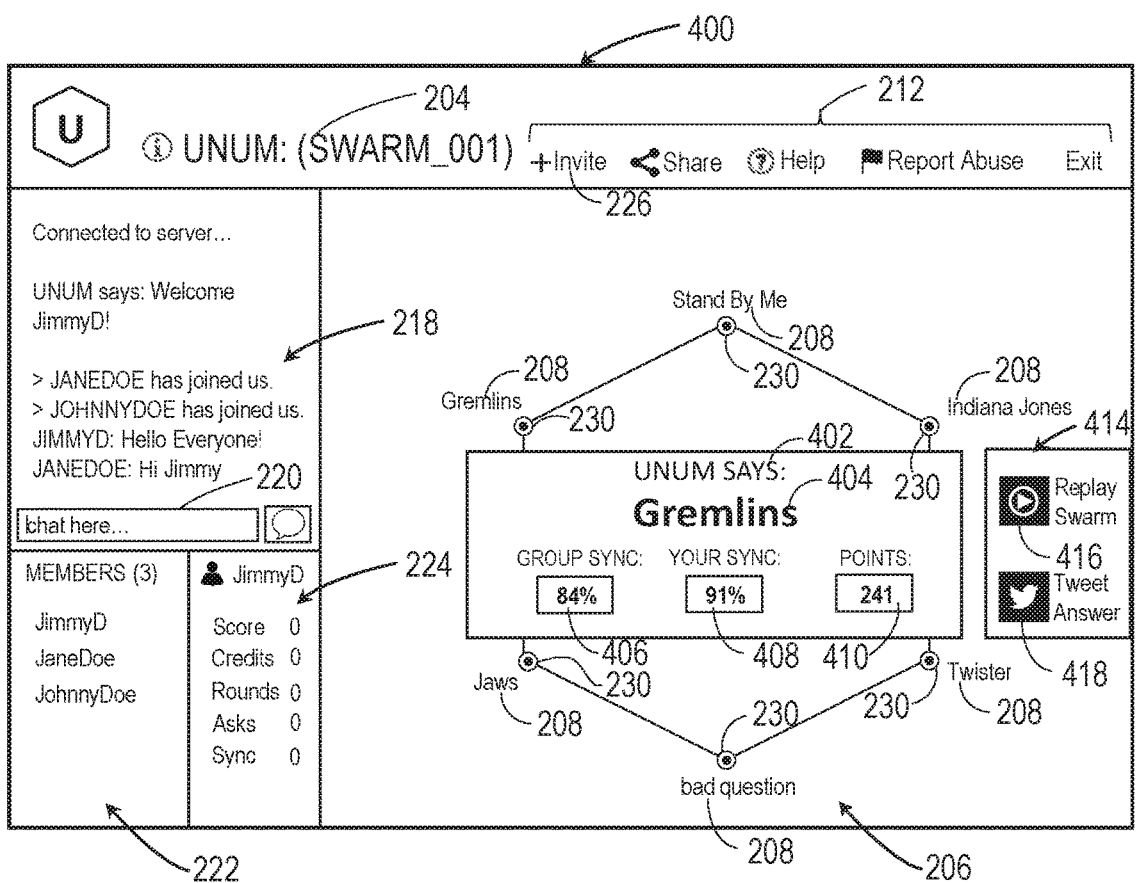
FIG. 4 is an exemplary group display interface of the computing device of the collaborative system after the collaboration session has been successfully completed.

The system 100 is configured to determine that a target is achieved when the group successfully positions the pointer 210 over one input choice 208 for more than the threshold period of time. When the group targets one target location 230, the selected associated input choice 208 is displayed on the screens of all the users as the answer to the question. Also displayed may be statistics for that answer as shown below in FIG. 4, such as the group cohesiveness score and the user synchronicity value, as previously described in related application Ser. No. 14/708,038. Also displayed may be points and/or credits awarded for the current user's participation in the emergent answer, as shown in FIG. 4.

Figure 3:
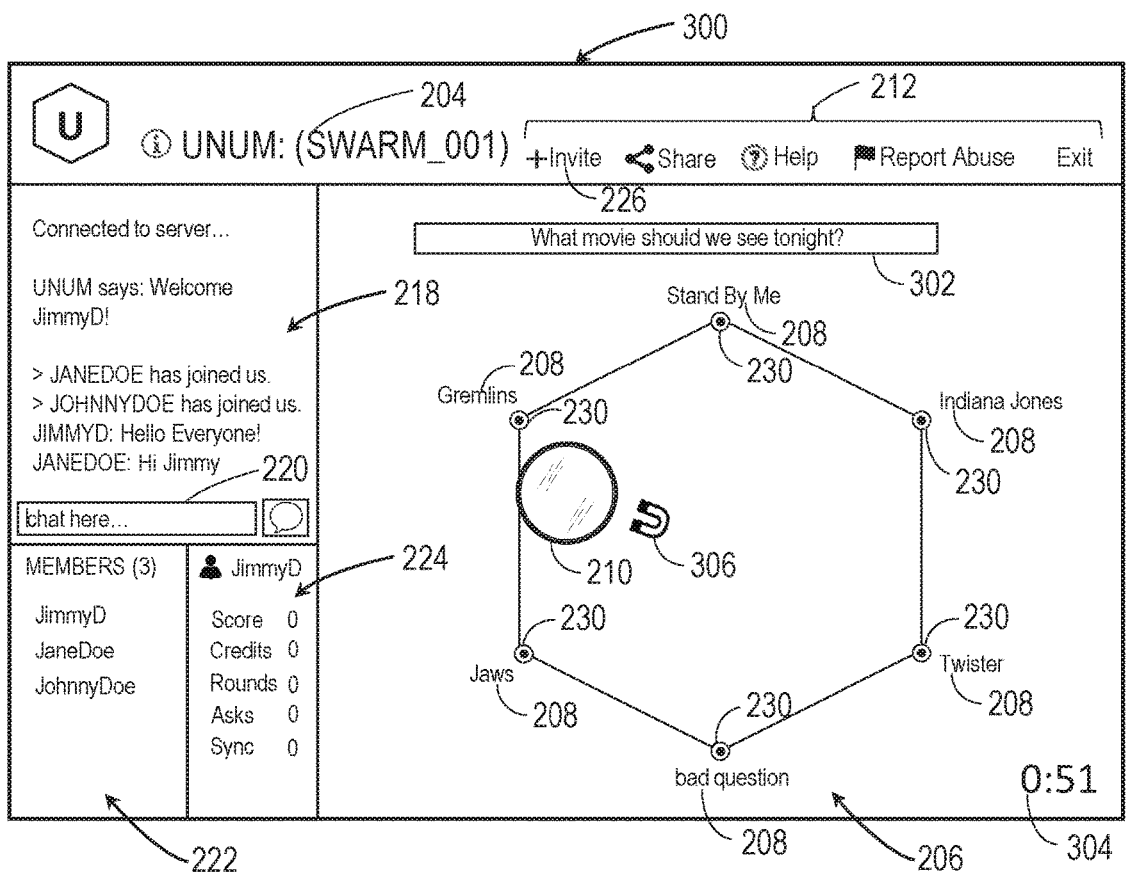
FIG. 3 is an exemplary group display interface of the computing device of the collaborative system at a point in time during a collaboration session.

Referring next to FIG. 3, shown is the exemplary group display interface 300 of one user at a point in time during a collaboration session, i.e. after the question has been received by the computing devices 104 but before the collaboration session has ended. Shown are the group name 204, the target area 206, the plurality of input choices 208, the pointer 210, the communication menu 212, the chat window 218, the chat input box 220, the current member list 222, the statistics display 224, the invite button 226, the plurality of target locations 230, a question display 302, a countdown clock 304, and a magnet icon 306.

As shown in FIG. 3, the basic layout of the display interface 300 is similar to FIG. 2. In FIG. 3, in the target area 206 the prompt bar 202, the ask button 228, the board selection drop-down menu 214, and the physics selection drop-down menu 216 have been replaced by the question display 302. The question display 302 appears substantially simultaneously upon the screens of the computers of all users in the swarm. Also displayed on the target area 206 are the set of target locations 230 spatially arranged on the display, with one input choices 208 associated with each target location 230. In this case the question is—"What movie should we see tonight?" and the input choices 208 include five movie names: "Jaws", "Gremlins", "Stand By Me", "Indiana Jones", and "Twister" along with a sixth input choice 208, "Bad Question". In many embodiments, the Bad Question choice is automatically included in the input choices 208 by the CCS 102, allowing the swarm to collectively reject the question. This allows the group not to waste time on incoherent or undesirable questions.

After the question and input choices 208 appear on the display interfaces of the group members, the "3"-"2"-"1" countdown timer appears (not shown) to signal the start of the current session. When the session begins, the users are now enabled to provide user input to the pointer 210, guiding it towards one of the target locations 230. As the session time progresses, the 60 second countdown clock 304 counts down, applying time pressure to the group. In FIG. 3, the countdown clock 304 is shown at 0:51, indicating that 51 seconds remain in the current session. During the current session, group members may also be inputting messages via text using the chat window 218, and/or may be chatting with a simultaneously enabled group voice chat. This allows interpersonal communication during the session.

As disclosed in the co-pending applications which have been incorporated by reference, each user is enabled to apply forces upon the pointer 210 to convey his individual intent as to how the pointer 210 should move at any moment in time. The displayed motion of the pointer 210, however, is not a reflection of that user's individual input but a reflection of the collectively combined group input from the entire swarm of users. As disclosed in co-pending applications, the collective input from the plurality of users can be such that each user's input imparts an equally weighted contribution to the total force applied to the pointer 210. In some embodiments, weighting factors are used to give the input force from some users a higher contribution as compared to other users. As will be described later in this document, novel methods of adjusting the weighting factors have been developed such that computational configuration of swarms can be dynamically changed over time by the underlying software running on the CCS 102, optimizing the collaborative performance of a given group based on the historical performance of its members.

As disclosed in the co-pending applications which have been incorporated by reference, each user is enabled to apply forces upon the pointer 210 using one of a variety of innovative methods. In one preferred embodiment, disclosed in application Ser. No. 14/473,768, each user controls the graphical magnet icon 306 by manipulating a mouse, touchpad, touchscreen, tilt interface, or other provided user-interface method. In one such embodiment, as the user moves his mouse cursor within a threshold distance of the pointer 210, it turns into the magnet icon 306 that grows larger in size, the closer to the pointer 210 the mouse is positioned. The larger size indicates a larger force. The relative position of the magnet icon 306, which always orients itself towards a center of the pointer 210 under software control, indicates the direction of pull that user wants to impart on the pointer 210. In this way, a user can intuitively impart of force of a selectable magnitude and direction upon the pointer 210.

In other embodiments, the user can tilt the portable computing device 104 to convey a desired magnitude and direction. In such embodiments, the magnet icon 306 or other graphical indicator is displayed to indicate the imparted force. In some such embodiments, the user must also tap the screen while tilting the computing device 104, the frequency of the taps causing a higher force to be applied. This unique use of a combined tilt and tap methodology is highly effective, for it enables one handed input from users on small mobile devices. It also enables the ease of tilting, but avoids it feeling too passive by also requiring frequent tapping. In many such embodiments, the maximum force is applied for only a short time following each tap (for example 0.5 seconds) and then fades away over a subsequent period of time (for example 3 to 5 seconds). The displayed magnet icon 306 shrinks and fades away along with the force magnitude. This is a highly intuitive interface and requires that a user repeatedly tap to maintain a maximally applied force upon the pointer 210. This is an innovative implementation, for it has been found that requiring frequent tapping better engages the user in the collaborative experience when the tilt interface is used.

In other embodiments the user is enabled to swipe across a touchscreen display to indicate the magnitude and direction of the force the user desires to apply to the pointer 210. In many such embodiments the magnet icon 306 is displayed, indicative of the magnitude and direction conveyed by the swipe. In such embodiments, the swipe force is applied for only a short time (for example 0.5 seconds) and then fades away over a period of time (for example 3 to 5 seconds). The magnet shrinks and fades away along with the force magnitude. This is a highly intuitive interface and requires that the user repeatedly swipe the screen to maintain a maximally applied force upon the pointer 210. This is an innovative implementation, for requiring frequent and repeated swipes better engages the user in the collaborative experience when the swipe interface is used.

As disclosed in the co-pending applications, the CCS 102 software collects input from the plurality of users, computes a resultant motion of the pointer 210, and communicates the resultant motion of the pointer 210 to each CIA 110 of the plurality of computing devices 104. The CCS 102 software also determines if the pointer 210 location is successfully targeting one input choice 208 for more than the threshold amount of time. If so, the CCS 102 software determines that the question is answered and communicates the targeted input choice 208 to all members of the group such that it is substantially simultaneously displayed upon the display interface of each computing device 104 included in the group.

In this way, the system 100 of the present invention enables groups of networked users to collaboratively control the graphical pointer 210 in response to one or more questions posed by members of group. More specifically, embodiments of the current system 100 enable each of the plurality of users to view on a screen of their own individual computing devices 104, a representation of the pointer 210 and the target board, and enable each of said users to convey the user intent (also referred to as the user intent value) as to the desired direction (and optionally magnitude) of motion that user wants the pointer 210 to move so as to select one of the input choices displayed on the target area. The user intent is represented as a user intent vector. The user intent vector can be conveyed by the user, for example, by tilting his computing device 104 in the desired direction, swiping the screen in a desired direction, or positioning the mouse such that the graphical magnet icon 306 pulls on the pointer 210 with a desired direction.

In some embodiments, eye tracking hardware and software are included in the computing device 104, for example the eye tracking hardware and software disclosed in U.S. Pat. No. 7,429,108 to the present inventor. The CIA 110 is configured to operate the eye tracking hardware and software and receive input from the eye tracking hardware are software. In the current innovation, a user's gaze is tracked by the CIA 110 and used to compute the user intent vector that represents the user's desired motion of the pointer 210, which is communicated to the CCS 102 software. More specifically, the user's gaze defines a location with respect to the pointer 210. The vector between the location and the center of the pointer 210 is then used by the CIA 110 to compute the magnitude and direction of the user intent vector. In this way, the user can simply look towards a direction that he desires the pointer 210 to move, and the user intent vector is computed by the CIA 110 and sent to the CCS 102 software by the CIA 110. In some instances the magnet icon 306 or other graphical element is displayed to represent the user intent vector on the display. In this way, the user can participate in the collaborative swarm intelligence experience using a hands-free method.

In some embodiments, a brain-computer interface (sometimes called a mind-machine interface, direct neural interface, synthetic telepathy interface, or a brain-machine interface), is employed to collect the user input of one or more users in the swarm. In some such embodiments, the user's brain-waves are detected by the brain-computer interface as he or she watches the pointer 210 move upon his screen. A calibration session is often required to correlate detected brain activity with a desired direction of motion of the pointer 210, but once that calibration is complete, the brain-computer interface system can be used by the CIA 110 to compute the user intent vector that represents that user's desired motion of the pointer 210 at each time-step during the session, this user intent vector being communicated to the CCS 102 software. In this way, the user can simply think about a direction that he desires the pointer 210 to move, and the user intent vector is computed and sent to the CCS 102 software by the CIA 110. In some instances the magnet icon 306 or other graphical element is displayed to represent the user intent vector on the screen of the user's computing device 104. In this way, the user can participate in the collaborative swarm intelligence using a hands-free method.

Whatever the input method used (mouse, touchscreen, tilt, eye-tracking, or brain-tracking), the system is configured such that the user intent vector is communicated by the CIA 110, running on the user's computing device 104, to the Central Collaboration (CCS) 102. The CCS 102 collects the user intent vectors from the plurality of users (via their separate computing devices 104), and then derives a group intent vector that represents the collective will of the group at that time. The group intent vector is then used to compute an updated location of the pointer 210 with respect to the target area and the target locations 230, the updated location reflecting the collective will of the group.

In many preferred embodiments, a physical model is employed in which the pointer 210 is assigned a simulated mass and damping, each user input represented as a simulated force vector. In some such embodiments, the mass and damping of the pointer 210 is adjusted dynamically by the software depending upon a physics mode selected by the user who asks each question by using the physics selection drop-down menu 216 shown in FIG. 2. In some such embodiments, the ice mode can be selected by the user in which the pointer 210 glides very freely as if on ice. In some such embodiments, the heavy mode can be selected by the user in which the pointer 210 requires the collaborative pull of a large majority of members of the swarm to achieve any real velocity. In some embodiments, the mass and damping are dynamically assigned by the software on the CCS 102 depending upon the current size of the swarm, the larger the swarm the higher the mass and higher the damping assigned.

Whether a physics model is used or not, the updated pointer 210 location is then sent by the CCS 102 to each of the computing devices 104 and is used by the CIA 110 running on each of said computing devices 104 to update the displayed location of the pointer 210. In this way, the plurality of users can watch the pointer 210 move, not based on their own individual input, but based on the overall collective intent of the group.

As described in related U.S. patent application Ser. No. 14/668,970, the group intent vector can be computed from the plurality of user intent vectors as a simple average, or may be computed as a weighted average in which some users have more influence on the resulting collective group intent than other users. In such embodiments, the weighting of each user can be derived based on user scores and/or user synchronicity values (also referred to as synchrony values) earned during prior interactions with the system 100. In such embodiments, each user may be assigned one or more variables that represents how his or her input should be weighted with respect to other users in the swarm. In some embodiments the variable is called the user contribution index and is updated regularly to reflect the skill of that user in providing input that helps the group reach a coherent collaborative response. The user who demonstrates a history of "constructive input" (i.e. input that is supportive of the collective intent, will be assigned a higher user contribution index than the user who has demonstrated a history of "destructive input" (i.e. input that is substantially resistant to the collective intent). In this way, users are incentivized push for collaborative consensus.

Those users who are supportive to the emerging consensus are determined computationally by the CCS 102 by repeatedly comparing each user's user intent vector with the group intent vector. The more aligned that user's user intent vector is with the direction of the group intent vector, the more collaborative that user is behaving. The further the user intent vector is from the direction of the group intent vector, the less collaborative the user is behaving. This level of collaboration is represented by the value defined herein and in the related applications as the user's synchrony (or synchronicity). The synchronicity value may be an instant synchronicity value, i.e. one at a certain instant in time, or may be a session synchronicity value representing the overall user synchronicity for one or more sessions.

The synchronicity value for each individual user is determined by the CCS 102 by repeatedly comparing the user intent received from each computing device 104 (representing the user input reflecting the user's intent to move the graphical object of the pointer 210 in a given direction) with the group intent derived from all user intents. The synchronicity value of the individual user is determined but computing the difference between the user intent and the group intent. The synchronicity value may be an instant value, i.e., based on a single comparison of the user intent to the group intent at one point in time, or may be synchronicity value over a specific period of time, e.g. an average of the synchronicity values over that period. Thereby, the user synchronicity value each individual user represents at least in part that user's contribution to the collaborative control of the at least one graphical object.

In some embodiments, each individual's synchrony value ranges between an upper bound value and a lower bound value. In one embodiment, the synchronicity value ranges between +1 to −1, with the value +1 (the upper bound) being assigned when the user intent vector is substantially aligned with the group intent vector, and with the value of −1 (the lower bound) being assigned when the user intent vector is substantially in the opposite direction of the group intent vector, with all values between +1 and −1 being used to represent varying degrees of alignment. For example, if the user intent vector is 90 degrees out phase with the group intent vector, a value of 0 is assigned, for that is halfway between fully convergent and fully divergent. Thus, a skilled user is one who is able to convey his individual intent as input, but do so in a cooperative manner. Such a user will maintain a positive synchrony value during much of the session, for he or she is being supportive of the group intent. A user who maintains a positive value will be awarded more points and be assigned a higher user contribution index than a user who does not.

In some embodiments, the user's synchronicity values are computed as a percentage from 0% to 100%, for that is often an easier metric for users to understand. The session synchronicity value of 100% means the user has been perfectly in sync with the swarm. The session synchronicity value of 0% means the user has been entirely out of sync with the swarm. Session synchronicity values between 0% and 100% reflect relative synchronization with the swarm, with a 50% synchronicity value meaning the user was neutral with respect to the swarm. This is described in more detail later in this document.

In some embodiments, an average (or mean) synchronicity value is computed for the user over some number of prior questions. For example a "sync_5" synchronicity value can be computed as that user's average synchronicity value over the last five sessions. This is a highly useful value for it indicates how cooperative the user has been over a recent period of time. The "sync_5" synchronicity value can be used in combination with other time-histories, such as a "sync_50" synchronicity value which indicates the average synchronicity value for that user over the last 50 sessions, in order to compute that user's weighting value in the swarm. In some embodiments, the mean synchronicity value may be time-weighted such that time steps near the end of the session time period are more heavily weighted than time steps near the start of the time period.

In some embodiments, the CCS 102 determines at least one user assessment based at least in part upon one of more user synchronicity values. For examples, one assessment may be configured to determine whether the user is categorized as "flexible" or "entrenched". In another example, one assessment may be configured to determine whether the user is "constructive" or "destructive".

Referring next to FIG. 4, shown is an exemplary display interface 400 as displayed on the computing device 104 being used by one user of a group, shown at a moment in time after the group has successfully positioned the pointer 210 on one of the input choices 208, selecting the input choice 208 as the target, thereby collaboratively choosing the answer. Shown are the group name 204, the target area 206, the plurality of input choices 208, the communication menu 212, the chat window 218, the chat input box 220, the current member list 222, the statistics display 224, the invite button 226, the plurality of target locations 230, a prefix text 402, a target text 404, a group cohesiveness score indication 406, a session synchronicity value score indication 408, a points indication 410, an answer window 412, an answer options tab 414, a replay swarm icon 416, and a Tweet answer icon 418.

In this instance, the target (i.e. the input choice 208 associated with the selected target location 230) is "Gremlins", reflecting the swarm's collaborative will in response to the posed question: "What movie should we see tonight?" As shown in FIG. 4, the target is graphically displayed to each user on the screen of his or her computing device 104 (as controlled by the CIA 110 running on that device 104). In the embodiment shown, the graphical display includes the answer window 412 including the prefix text 402 "UNUM says:" along with the chosen target: "Gremlins".

In some embodiments, the answer is also displayed in the chat window 218, as if communicated by the personified entity "UNUM" itself. This gives the swarm intelligence a feeling of personality and presence.

Also displayed in the answer window 412 is one or more statistics computed by the CCS 102 software. The statistics may reflect the performance of the group as a whole or reflect the performance of the particular user of that computing device 104. In this example, the group cohesiveness score indication 406, reflecting the synchronicity of the group, is shown of 84%, which indicates that the group was 84% aligned in their imparted motion of the pointer 210. The group cohesiveness score indication 406 includes the text "GROUP SYNC:" The group cohesiveness score of 84% shows strong convergence of group members, reflecting that the swarm intelligence spoke with high "conviction" when answering this question. A low group cohesiveness score would reflect a low conviction for the swarm intelligence. In some embodiments the group cohesiveness score may be repeatedly reported to and repeatedly displayed by each of the computing devices 104, for example during the session.

Related application Ser. No. 14/708,038 discloses some methods of computing the group cohesiveness score, such as to compute a running average of the absolute value (i.e. magnitude) of the group intent vector over time.

The group cohesiveness score may have an upper bound and a lower bound, wherein a group cohesiveness score at the upper bound indicates that the plurality of real-time user intents are substantially aligned with each other, and a group cohesiveness score at the lower bound indicates that the plurality of real-time user intent values are substantially misaligned with each other. In one embodiment, the lower bound is essentially 0, as the summation of the user intent vectors, being opposite (exactly misaligned), cancel each other out.

In some embodiments, the CCS 102 determines at least one group assessment based at least in part upon one of more group cohesiveness scores. For examples, one assessment may be configured to determine whether the group is categorized as "flexible" or "entrenched".

The group cohesiveness score may be repeatedly calculated by the CCS 102 during the session and repeatedly received by each of the portable computing devices 104.

In another embodiment, the real-time user intent values are determined to be substantially aligned with each other (i.e. at or near the upper bound) when their vector directions are substantially the same in at least a plane. The real-time user intent values are determined to be substantially misaligned with each other (i.e. at or near the lower bound) when a summation of their vector directions substantially cancel each other out, resulting in a near zero resultant.

Also displayed in the answer window 412 is the session user synchronicity value score indication 408. The session user synchronicity value is a statistical indication of how well the particular user of this computing device 104 was aligned in his input with the swarm as a whole. The session synchronicity value score indication 408 includes the text "YOUR SYNC:" and value of 91%. In this case, the user was very highly aligned, achieving a 91% synchronicity value.

Also displayed in the answer window 412 is the points indication 410, indicating the number of points earned by this user as a result of his or her participation during the session. The user in this session has earned 241 points, as shown in the points indication 410. The points indication 410 also includes the text "POINTS:"

Users earn more points (or credits) as a result of being constructively collaborative, helping the swarm reach a meaningful consensus. Users earn less points (credits) as a result of being non-collaborative (obstructive), blocking the swarm from finding a meaningful consensus. In the case where the swarm cannot answer a question within the allotted time because consensus is never reached, all users lose points (credits). This innovative scoring method encourages participants to be collaborative rather than obstructionist, thereby improving the performance of the swarm intelligence. This imposes a philosophical situation often referred to as a Prisoner's Dilemma and structures it uniquely such that group collaboration and consensus trumps group stagnation and entrenchment. In this way, the present invention helps groups to find common ground.

Also displayed is the answer options tab 414 which gives users options related to the answer that was just reached by the swarm. The user can selectively Tweet® the answer by selecting the Tweet answer icon 418. This triggers a routine within the CIA 110 that sends a Tweet request to the CCS 102 software, which then sends an automated Tweet to Twitter. The Tweet includes the question and the selected answer. The Tweet also includes a numerical indication of the number of users who participated in answering the given question, thus conveying the size of the swarm intelligence which produced this Tweet. The Tweet also includes a hashtag, for example "#UNUMsays", as well as an indication of the group cohesiveness score. In this way, the swarm intelligence system comprised of dozens, hundreds, or even thousands of individual minds working as one can is given a unique voice as a social media entity. Enabling collaborative groups to ask questions, answer questions, and voice the swarm's collaborative intent over Twitter as a unique entity is highly unique and appealing to users. In some embodiments, the decision to Tweet an answer is posed by the software to the swarm. A question appears, e.g. "Should we tweet this?", and a set of answers appear "yes", "no", etc. If the group picks "yes" or an equivalent, the swarm intelligence has decided to send its own Tweet. In this way, the invention described herein enables the formation of a swarm intelligence, enables that swarm intelligence to answer questions, enables that swarm intelligence to consider the answer that emerges and decide if that swarm intelligence wants to Tweet the answer publicly.

As also included in the answer options tab 414, each individual user can select a replay swarm icon 416. Upon selection of the replay swarm icon 416, the session resulting in the current answer is replayed on the display. The session replay is unique in that it displays an indication of the input of all users in the group at the same time (i.e. the swarm input), giving insight into how the swarm converged upon the collective answer. The video of the swarm input is displayed in high speed (generally 2× to 5× the speed of the real session). This saves time while also conveying a more intuitive display of swarm activity, for the high speed motion of the swarm input indicates the central tendencies more effectively than a real-time display.

Figure 5:
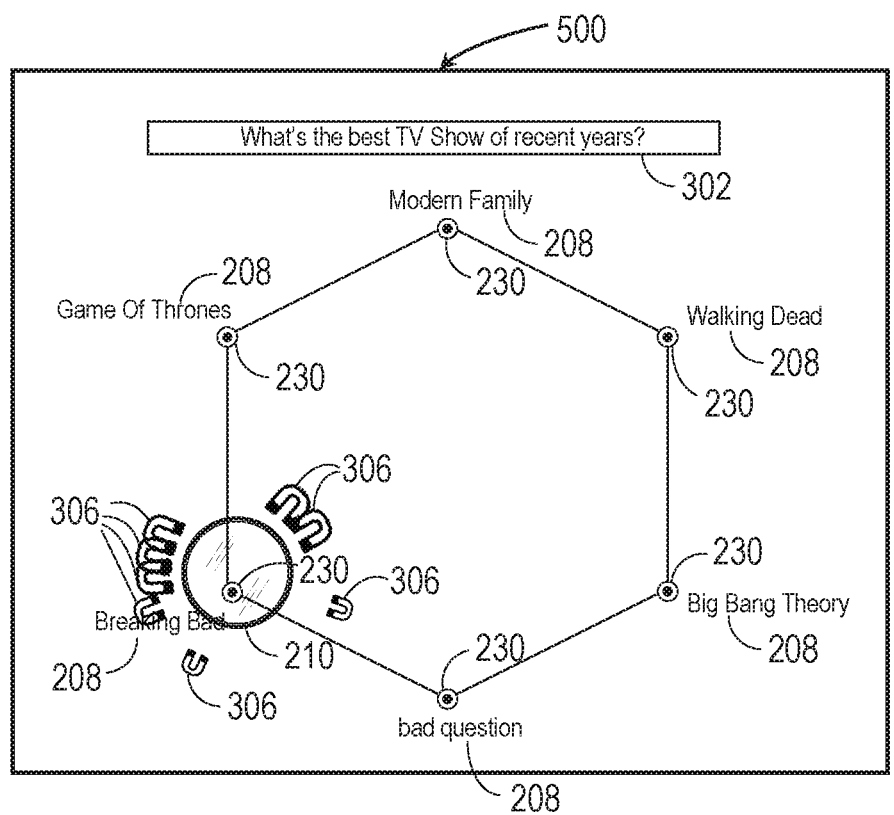
FIG. 5 is a frame of an exemplary collaboration session replay video.

Referring next to FIG. 5, a frame of an exemplary session replay video 500 is shown. Shown are the target area 206, the plurality of input choices 208, the plurality of target locations 230, the question display 302, and the plurality of magnet icons 306.

As shown in FIG. 5, the session replay includes the question asked, the target locations 230, the input choices 208 associated with the target locations 230, t and the graphical indication of the trajectory taken by the pointer 210 during the answer period. Also displayed is the graphical indication of the input provided by each user of the swarm at each time-step during the answer session. In this instance, the graphical magnet icon 306 is displayed for each user, the size and orientation of each magnet icon 306 with respect to the pointer 210 indicating the magnitude and direction of that user's user intent vector (magnitude and direction) upon the pointer 210 at each given moment in time. In this example, 8 users were participating in the swarm, collaboratively moving the pointer 210 to an answer. This method is scalable to much larger numbers of users.

In some embodiments where hundreds or even thousands of users are participating at the same time, other innovative methods are employed to make the replay coherent. In one such embodiment, when the number of magnet icons 306 exceeds a threshold, they are grouped and averaged, for example showing one composite magnet icon 306 to represent every group of 10 in the swarm. In this way, a swarm with 800 users can be represented by a replay display of 80 magnet icons 306. This is highly informative to the user, conveying the central tendency of the swarm without overwhelming the display with too many magnet icons 306 (or other graphical indicators). In some embodiments, the user can select the replay speed.

Hybrid Swarm Intelligence System

While the methods and systems described above enable groups of human participants to form an online artificial swarm intelligence, what is needed are advanced methods that enable swarms to include both human participants, and machine participants that are driven by artificial intelligence processes. Referred to herein as a "hybrid" swarm intelligence system, this novel methodology enables a single unified emergent intelligence to form from a closed-loop real-time system of both human minds and A.I. minds. In other words, a "hive mind" of humans and machines. Our research suggests that such hybrid human-machine Swarm Intelligence systems will be smarter than humans or machines, alone.

In the natural world, swarm intelligence enables groups of individual organisms—such as flocks of birds, swarms of bees, and schools of fish—to amplify their collective intelligence and reach optimized decisions. In recent years, Unanimous A.I. has extended the power of swarm intelligence to human groups. Because humans lack the natural mechanisms used by birds, bees, and fish to form closed-loop dynamic systems, Unanimous has developed unique technology that enables human groups to form artificial swarms online. Referred to as artificial swarm intelligence, such systems have been shown to achieve the benefits observed in natural systems—amplifying group intelligence and optimizing group predictions. The system systems described below extend the predictive power of Swarm Intelligence by forming hybrid swarms (h-Swarms) that include both machine agents and human participants, the machine agents representing the output of artificial intelligences.

On the pages below, the h-Swarm system is described in the context of an artificial intelligence that makes geopolitical forecasts. That's used as an example, so the system is concrete, but it's understood that a wide variety of artificial intelligent systems (not just forecasting systems) can be used in the methodology described herein. For example, a variety of artificial intelligent systems that can respond to a query by generating a statistical output can have that output converted into a machine swarming agent using the methods described below and thereby participate in the hybrid Swarm Intelligence.

Figure 6:
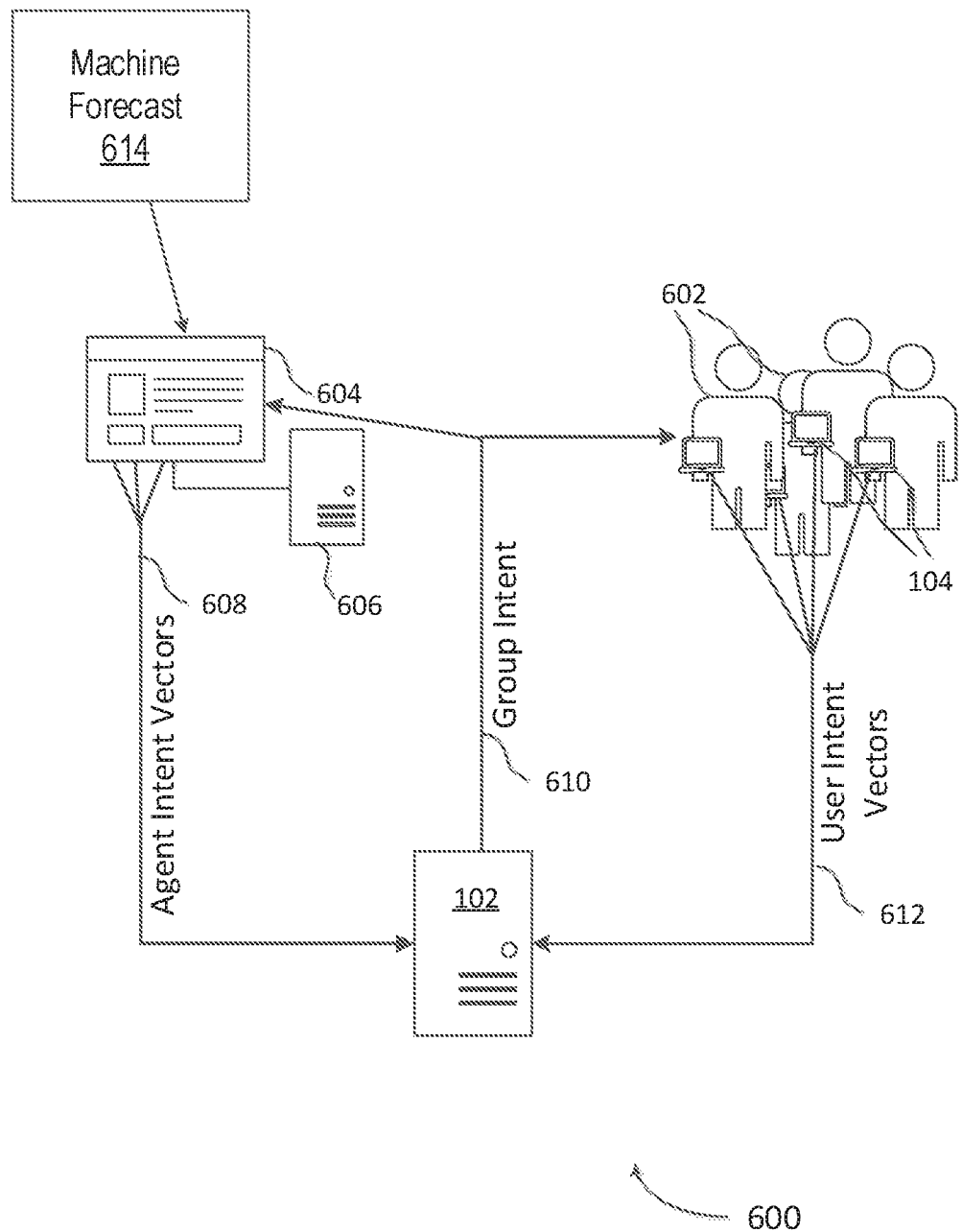
FIG. 6 is a high-level system diagram of an exemplary hybrid swarm intelligence system in accordance with another embodiment of the present invention.

Referring next to FIG. 6, a high-level system diagram of an exemplary hybrid swarm intelligence system 600 is shown. Shown are the CCS 102, the plurality of computing devices 104, a plurality of users 602, an agent application 604, an agent computing device 606, agent intent vectors 608, a group intent 610, user intent vectors 612, and machine forecast data 614.

In the embodiment shown in FIG. 6, the agent application resides on and is run on the agent computing device 606 in networked communication with the CCS 102. In other embodiments the agent application 604 resides on and is run by the CCS 102.

When the agent application 604 resides on the CCS 102, any data transfer between the agent application 604 and the collaboration software 108 of the CCS 102 is directly between the agent application 604 and the collaboration software 108. If the agent application 604 resides on the remote agent computing device 606, as shown in FIG. 6, the data transfer is over the communication network.

In one embodiments, the agent computing device 606 is included in a first cloud-based system, such as Amazon Web Services and the CCS 102 is included in a second cloud-based system (which may be the same as the first cloud-based system).

The agent application 604 also receives the machine forecast 614 and uses it to generate agent intent vectors 608 during a collaborative session.

As previously described, each user 602 is associated with one computing device 104, each computing device 104 running the CIA 110 and in networked communication with the CCS 102. During the group collaboration session, as previously described, user intent vectors 612 from the user responses during the session (such as the user intent vectors 612 previously described) are determined from each user input and are sent to the CCS 102. Each user intent vector 612 represents that user's desired motion of the pointer 210, i.e. the user intent vector 612 represent imparting a user-directed motion onto the pointer 210. In the hybrid swarm intelligence system 600, the CCS 102 also receives agent intent vectors 608 generated by the agent application 604. The agent intent vectors 608 is of similar structure to the user intent vectors 612, and is generated by the agent application 604 using suitable methods (as described further below) and pre-defined parameters including the machine forecast data 614. Analogous to the user intent vectors 612, each agent intent vector 608 represents an agent-directed motion imparted onto the pointer 210. While in the present embodiment, the interaction of the A.I. "agents" during the collaboration session is described as agent intent vectors 608, in conformance with the previous disclosure, it will be understood that in other embodiments of the hybrid collaboration system, the agent application may send another type of output to the CCS 102, as long as the overall closed-loop system is maintained (i.e. the CCS 102 receives input from the users 602 and generated by the agent application 604, whereby the CCS 102 determines an overall group result and sends it to the users 602 and the agent application 604, which in response again send input to the CCS 102, repeating the loop).

While the information sent to the CCS/server 102 is disclosed in FIG. 6 as being vectors (the user intent vectors 612 and the agent intent vectors 608), in other embodiments the information sent to the server 102 may be of a different format, as long as the information is representative of the user inputs and the output of the agent application 604. In general terms, the information may be described as user input values and machine agent values, respectively.

In the present embodiment, the machine forecast is a set of static percentages for each answer choice of the group collaboration session, with each machine forecast value associated with a different answer choice (i.e. the machine forecast values and the answer choices have a one-to-one relationship). For example, for a set of six answer choices numbered 1-6, the machine forecast could be choice 1: 56%, choice 2: 23%, choice 3: 1%, choice 4: 6%, choice 5: 4%, and choice 6: 10%. These percentages are used in part by the agent application 604 to repeatedly generate the agent intent vectors 608, which are then sent to the CCS 102 and used to determine the resulting group intent vector. The machine forecast may also be expressed as a set of probabilities.

The group collaboration method for the hybrid swarm system is described further below in FIG. 7.

Referring again to FIG. 6, The machine forecast 614 (or forecasts) mentioned above are static projections (set of percentages) that reflect the A.I. intent (as expressed in the agent application) with respect to the given query. In order for the A.I. to participate in the real-time closed-loop hybrid swarm, the agent application 604 represents each of these statistical projections as one or more Machine Swarming Agents that can perform with human participants within an Artificial Swarm Intelligence. The resultant contribution to the collaborative session are the agent intent vectors 608, which are repeatedly determined by the agent application 604 in real-time response to the group intent 610 during the session.

Each Machine Swarming Agent generated by the agent application 604 will function as a "simulated human" that expresses its will within the swarm, pushing and pulling on the system based on the probabilities it represents. There are various methods for generating the behavioral models for the Machine Swarming Agents. Examples of methods for generating the input to the collaborative session include heuristic behavioral modeling, drift diffusion, and/or machine learning using data from human surrogates, although other suitable A.I. or learning methods are also contemplated.

Heuristic Behavioral Modeling

To convert the Machine Forecast 614, represented as the static set of probabilities and confidence values, into the dynamic Machine Swarming Agent (as typically described herein as the agent intent vectors 608) that can interact with other agents in the real-time Artificial Swarm Intelligence, one approach is to define behavioral heuristics that govern the Machine Swarming Agent and the resulting agent intent vectors 608. These heuristics are logical rules based on the observed dynamics of human participants—for example, "pull for the highest probability option unless the swarm starts to converge on an alternate option, then switch pull to the second highest probability option" or "defend against the lowest probability option without compromise." Such rules, based on observations, offer a fast way to create a basic dynamic agent to compare against more sophisticated models.

Drift Diffusion Models (DDM)

These methods are the current state-of-the art models to characterize decision-making (such as disclosed in Yeung and Summerfield, 2012) and offer a neurologically grounded explanation of decisions, reaction times and decision confidence. DDM models decision-making as a process of evidence accumulation. We start with the Machine Swarming Agents using a simple two-alternatives-forced-choice decision rule. This is modelled as two decision variables that accumulate the difference in evidence favoring each alternative over time. The accumulation process continues until the variable hits one of the two boundaries. The model is surprisingly rich in phenomena it can capture. For instance, urgency to answer (e.g., to avoid a swarming stalemate) can be captured by collapsing boundaries over time. This formulation accounts for the known accuracy-reaction times trade-off existing in many human decisions. Biases and prior information can be modelled by setting the initial variable to a value that favors one of the two options. Confidence in the decision can be captured by having two decision variables, one for each option, separately accumulating evidence in favor of their option. "Confidence" in a decision could be calculated as the difference between decision variables at the moment that decision is made, while the "strength of the evidence" can be mapped by the agent application 604 as the drift rate that determines how fast the decision is made.

The Drift Diffusion model, as known in the art, models decision making as a process of evidence accumulation that, upon reaching a boundary, triggers a given action. Different DDM versions share some common components: one or more decision variables (the accumulators); defined accumulation boundaries: defined drift rate; and (optionally)

collapsing boundary parameters as time limits press for an answer to avoid a stalemate. One example is a two-alternatives/forced-choice decision, where the subject has to select one of two alternative options, option A or B. The selection of an option can be represented as a race model between two decision variables dv1 and dv2 each accumulating evidence in their favor over time. The accumulation process continues until one of the dv hits a boundary. The strength of the evidence is well represented by the drift rate, namely the speed at which evidence accumulates for one option. Confidence in the final decision can be represented as the difference between the accumulators at the moment when the fastest accumulator hits the boundary.

An example of a simple Drift Diffusion Model accumulates a Decision Variable dv over time until it hits one of the two boundaries a or 0, where a represent a given behavior and 0 represents the default behavior or an alternative one. A starting point z can be manipulated to model prior knowledge and bias. The strength of the evidence is represented by the drift rate v.

Machine Learning (RL) Based on Human Surrogates

One or more machine learning methods may also be employed to learn the mapping between machine forecast probabilities and simulated behavioral actions. What is needed, however, is a clear training signal that allows the machine learning system to map probabilities to behaviors. Because the goal is to have machines mimic human behavior in the swarming system, what is needed to train the machine learning system is data that reveals how humans behave in the swarm during a group collaborative session, when trying to represent a set of probabilities in the decision process. To solve this, we have developed an innovative method that uses human participants. We call them "Human Surrogates" as they initially act as "human stand-ins" for the machine in the swarm. Each human surrogate is provided a set of probabilities that represent a machine forecast and would then represent that forecast within the hybrid swarm, using natural human instincts to convert probabilities to behaviors.

In one embodiment, each human surrogate will be provided a set of probabilities that represent the Machine Forecast and will then express that forecast during the group collaboration session, using natural human instincts to convert probabilities to behaviors. These surrogates will be driven solely by the "opinions" output by the Machine Forecast, i.e. the set of probabilities and confidence levels output by the Machine Forecaster. To motivate the participants, surrogates are paid proportionally to the probabilities that they should represent. For example, to motivate the surrogate to represent each of the probabilities aggressively, appropriate behaviors can be rewarded whereby the participant receives a bonus based on final answer reached by the Swarm. For example, if the forecast probabilities the human is representing are 72% for option A and 28% for option B, the human surrogate will be rewarded $0.72 if the puck lands on A and $0.28 if it lands on B. This ensures that there is a one to one relation between forecasted likelihood of the event and the surrogate's adherent conviction to that option. Importantly, this solution can offer a clear "distilled" method to measure the behavior of interest, in the sense that it is not affected by personal knowledge and prior beliefs. Indeed, the specific question and the responses available can be made invisible to the Surrogates, thus getting rid of prior beliefs that the surrogate might have regarding the subject of the question. In this way, we obtain a "pure" measure of the human swarming behavior generating only from the set of given probabilities. Moreover as differences may exist among different surrogates' strategies, the same set of probabilities can be given to a group of N surrogates and their influence rescaled to 1/N so that their average can be interpreted as "the average human" in a closed-loop collaborative swarm.

This method offers rich data on how probabilities are converted by human actors into overt action, providing training signals for the agent application 604.

In summary, the hybrid system starts with a team of humans who have performed their own individual scouting efforts and formed their own opinions as to given question (as described further below). The one or more Machine Forecasts are generated, which are converted into Machine Swarming Agents (as represented by the agent intent vectors 608) by the heuristic model, the DDM model, or the Machine Learning model generated by training on data collected based on the behavior of Human Surrogates. What is left is the final synchronous process where the Humans express their personal judgments within a swarm that includes Machine Swarming Agents. Together these human swarming agents and machine swarming agents converge on a final optimized answer, as described further below in FIG. 9.

Figure 7:
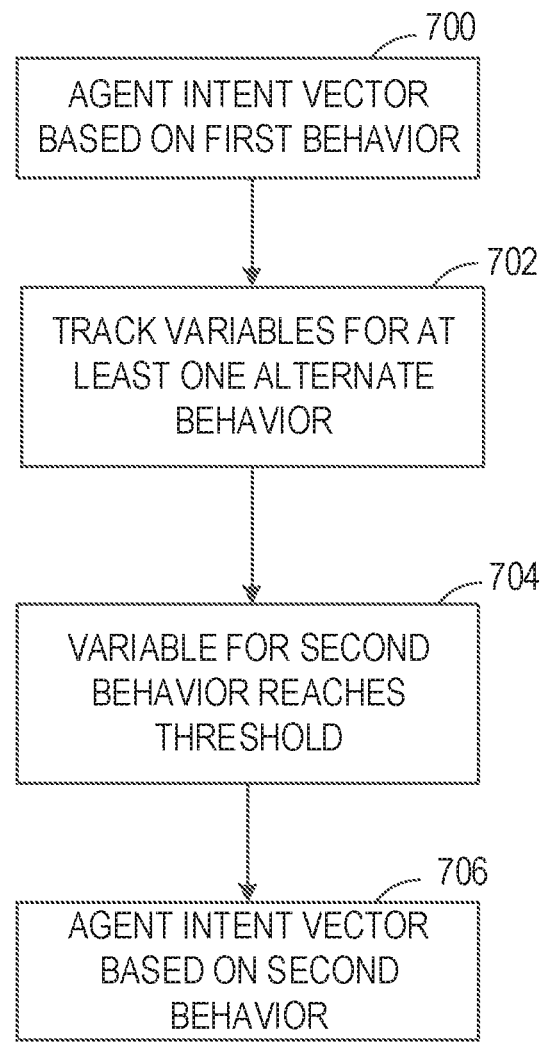
FIG. 7 is a flowchart for an exemplary method for determining swarming agent behavior during a collaboration session.

Referring next to FIG. 7, a flowchart for an exemplary method for determining swarming agent behavior during a collaboration session is shown. In the first agent intent behavior step 700, the agent application 604 generates one agent intent vector 608 during a session using a first behavior. It will be understood that the agent application may be generating a plurality of agent intent vectors 608, each with different algorithms and/or parameters. The first behavior may be a default behavior such as generating the agent intent vector corresponding to "pulling" towards the answer choice (input choice) 208 with the highest percentage in the machine forecast 614.

In the next track variables step 702, while the agent application 604 is continually generating the agent intent vector 608 using the first behavior and in response to the group intents 610 repeatedly received, the agent application 604 also tracks at least one decision variable, each decision variable representing an alternative behavior and each decision variable having a corresponding threshold. In some embodiments, the group intent 610 is an updated coordinate that indicates the current location of the collaboratively-controlled pointer 210 with respect to the plurality of target locations 230, each target 203 associated with one input choice (answer choice) 208. In some embodiments, the group intent 610 includes at least one of a current velocity, acceleration and direction of motion of the collaboratively-controlled graphical pointer 210.

When one of the decision variables crosses its threshold at a point in time during the session, in the variable reaches threshold step 704, In the current example, the threshold for the decision variable associated with a second behavior is reached.

In the next switch behavior step 706, the agent application 604 switches the agent intent vector behavior to the behavior corresponding to the decision variable that reached its threshold. In the current example, the agent intent vector 608 is now generated using the second behavior, different from the first behavior.

Referring again to FIG. 7, in the context of artificial human swarms, we use the machine forecast and the evidence we accumulate to develop a list of "typically human" behaviors that we want our Machine Agents to reproduce. Examples of these common behaviors will include but not be limited to: (1) switching to the next best option; (2) defending against (i.e. pulling away from) a low probability or disliked option; and (3) the ability to choose between multiple answer choices (input choices) 208 based at least in part upon (a) the relative size of the populations of participants pulling for each of the plurality of answer choices 208, and/or (b) the relative magnitude of the total pull imparted by participants towards each of the answer choices 208. The default behavior that the Machine Agent model will typically be adopting from time 0 is to pull in the direction of the favorite option, namely the option with the highest probability in the Machine Forecast. We can model the three behaviors above as three different decision variables (dv1, dv2, dv3) that accumulate evidence in their favor and three thresholds (a1, a2, a3). So for instance, for behavior (1) above, we can imagine a decision variable dv1 that over time keeps track of the (inverse) Euclidian distance from the current best option and a threshold a1 representing the maximum distance that the model will allow before switching. As time passes, the collaboratively controlled pointer (i.e. the "puck") moves around in the decision space within the swarming environment, affecting the quantity dv1. As soon as dv1 reaches the threshold a1, this triggers the model's force vector (i.e. the agent intent vector 608) to switch to pulling for the second best available option. Notice that although dv1 depends on the puck's position (and is therefore state-dependent), a1 is a free parameter that can be set to an arbitrary level prior to the session start time. This allows the same model to generate a set of different instances each characterized by a specific set of free parameters, reproducing the inter-individual variability that we observe in humans. Importantly we are able to both manipulate free parameters to maximize swarm performance and also configure free parameters so that they adhere to observed human behavior, thus maximizing their similarity to real human behavior data. The comparison between the two can provide valuable insights on whether humans can be described by optimal parameters (i.e. maximizing performance) or whether they underperform compared to optimized parameters.

Another free parameter of human behavior that we can implement in our Machine Agent behavior models is the rate of collapsing bound T, representing the trade-off between accuracy and time taken to make a decision. In the context of artificial human swarms, agents can balance the need to make accurate decisions with the need to reach a consensus before time runs out, which typically results in a group penalty. Better decisions are modeled by setting the height of the boundary 'a' to a greater value as this means that the model needs more evidence before committing to a decision. However, as time passes and the swarm approaches a situation of stalemate, the boundary "collapses" as the model is now willing to accept less evidence before committing to a decision. Once the behavior is triggered, the corresponding decision variable is reset to 0 and a new process of accumulation takes place, using as default the new state of the force vector (that is to say, the agent intent vector 608 begins pulling for the second-best option). The race between multiple decision accumulators will give rise to a complex behavioral pattern that can be again fit to observed human data or optimized for swarm performance.

It is important and interesting to note that observed human data might not be the same as optimal swarm behavior. Observed human data might generate a set of parameters than differs from parameters that would optimize swarm performance. If this is the case, optimizing for swarm performance implies that Machine Swarm Agents can take a complementary role to that of the Human Forecasters, pulling the Artificial Swarm Intelligence from human standards to super-human standards. For instance, if humans are typically stubborn in their convictions (e.g., they always pull for their best option), but this hampers overall swarm accuracy, then optimizing models' free parameters for swarm performance will naturally generate machine swarm agents that are much more flexible in their convictions. In this way we could create Machine Swarm Agents that adapt to (and compensate for) human sub-optimalities so as to maximize overall swarm performance. If this is the case, we can to achieve above-human performance over successive phases of the challenge.

Additionally, Machine learning can be used for the agent application 604 to learn optimal action policies from states (such as the percentages given to a human surrogate) to actions (the changes in pull on the puck/pointer 210, from one option to another during as session, as well as the location and velocity of the puck 210 with respect to the various options) optimized based on rewards (i.e. what answer the puck 210 landed on, and whether it was the first, second, third, etc. percentage option given to the human surrogate). Thus the machine learning process that converges on a behavioral model that represents human behavior, takes as states—the set of percentages a human aims to represent in a swarm, takes as actions the behaviors of the humans as they pull on the puck 210 in the swarm (tracking the location and orientation of their magnets as they pull for various options around the hexagon), and uses as rewards to optimize the action policies, the outcome of the swarm (i.e. which option the puck 210 landed on, and what percentage was associated with that option in the original set of percentages given to the human surrogate). In other words, how strongly did the human surrogate get his desired outcome.

The behavioral model, whether it's derived from heuristics, drift diffusion, or machine learning, is a set of predetermined rules that govern the way a Machine Swarming Agent applies an agent intent vector 608 on the puck 210 during a swarming session which can be a force vector 608 used in the physical model that governs puck motion. The agent intent vector 608 will vary its direction and magnitude based on how the puck 210 moves with respect to the various options. An effective Machine Swarming Agent (for example as represented by the agent intent vector 608) represents the "will" of the artificial intelligence, pulling first for the highest probability choice in the set of percentages, then switching to pull for lower probability choices if the puck 210 is determined to be moving in ways that indicate, that option is unlikely to be achieved. In addition, just like human participants, the machine swarming agents are programmed to defend against options they have very low probabilities for. Thus, if an option is represented to be a very low probability outcome (or low preference outcome) the machine behavioral model defends against that option, applying a vector force on the puck 210 that opposes the puck's motion towards that option. Similarly, behavioral models are designed to apply force vectors that would drive the puck 210 towards high probability options (or high preference options, depending on the type of question).

In some embodiments of the present invention, additional inventive methods are employed to increase the accuracy of human forecasts, machine forecast, and hybrid forecasts by monitoring the data collection process employed human participants before they engage in the real-time collaborative process. Specifically, the inventive methods involve the human participants being given access to the questions that will be asked in the collaborative process before engaging in the collaborative process, and being given an opportunity to search the internet for information that might assist them in forming their responses during the collaborative process. This participant searching effort is referred to herein as "scouting" and it's intended to increase the accuracy of the input provided by participants. There are multiple benefits of the inventive "scouting" process as will be described on pages to come. First, FIG. 8 illustrates a computational architecture that enables scouting among human participants and links the data collected during scouting to one or more machine models.

Figure 8:
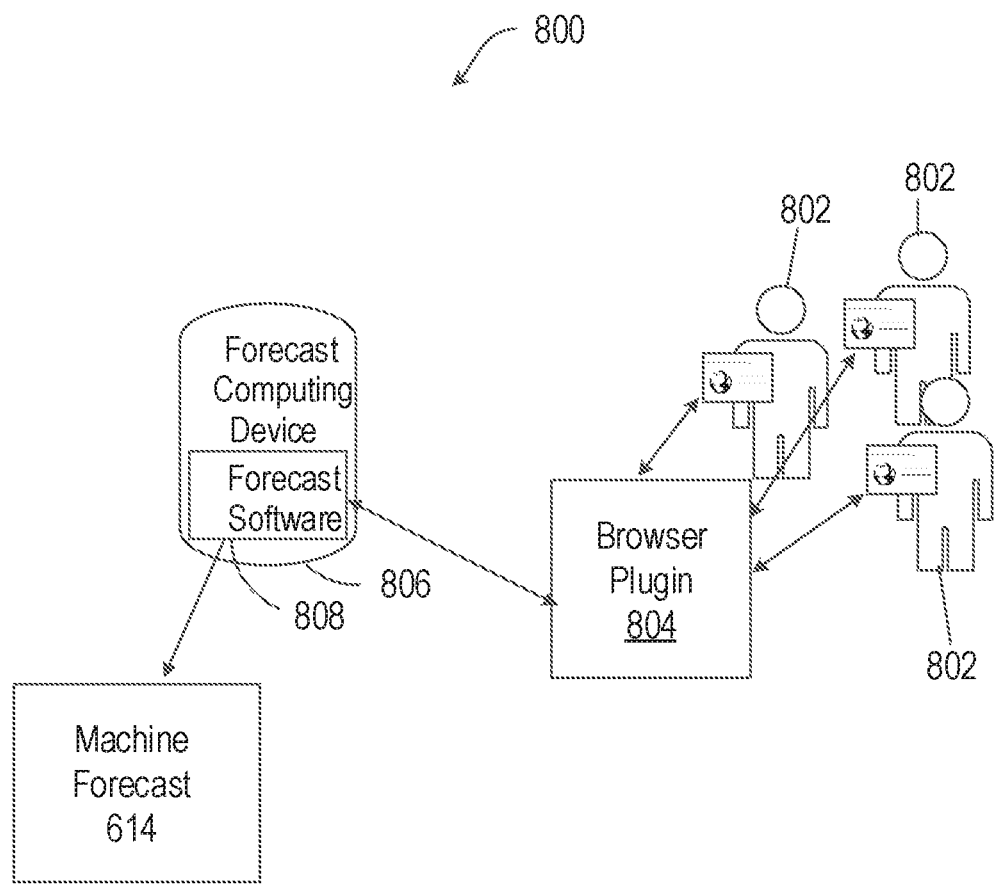
FIG. 8 is a schematic diagram for a machine forecast system.

Referring next to FIG. 8, a schematic diagram for a machine forecast system 800 is shown. Shown are a plurality of web-interactive persons 802, a browser plugin 804, a forecast computing device 806, a forecast software 808, and the machine forecast data 614.

The web-interactive persons 802 interact with the browser plugin 804 via a web browser such as Chrome. The browser plugin conveys the search information to the persons 802 and collects data and metadata both directly from the persons' 802 input and indirectly through their interactions with the browser.

The browser plugin 804 sends the data and metadata to the forecast software 808 running on the forecast computing device 806. The forecast computing device 806 may be one of the devices previously described, for example the CCS 102. The forecast software 808 is configured to analyze the data from the web-interactive persons 802 and generate the machine forecast data 614, which is then used in the hybrid swarm intelligence system 600 as previously described.

Figure 9:
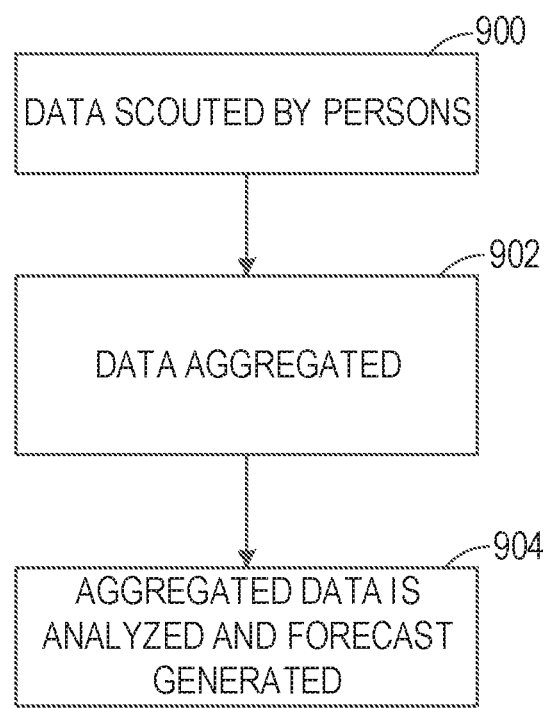
FIG. 9 is a flowchart of a method for forecast and generation.

Referring next to FIG. 9, a flowchart of a method for forecast and generation is shown. In the first data scouting step 900, the web-interactive persons 802, in response to a given query or request, perform independent web searches to parse the query, identify sources, and/or categorize findings.

Each person 802 will typically evaluate content on a number of vectors relating to the query, including importance, "bent", and validity. The data and metadata from each person 802 is collected by the browser plugin 407. The browser plugin, as part of the instrumented web browser, records all web pages visited by each person 802 and enables each person 802 to identify and tag relevant content as whole documents, highlighted passages, and/or identified datasets.

In the next aggregate data step 902, the collected data from each web-interactive person 802 is received by the forecast software 808. The forecast software 808 aggregates the search data from the plurality of web-interactive persons 802. It will be understood that in lieu of the forecast software 808 aggregating the data, a separate module of aggregating software may be used, either on the forecast computing device 806 or on a separate processor. Therefore, the data is received by the forecast software 808 either directly or indirectly from the browser plugin 804.

During the forecast generation step 904, the forecast software 808 analyzes the data and produces the machine forecast data 614. In the present embodiment, as previously described, the machine forecast data 614 is a set of percentages, with each percentage corresponding to a possible answer to the query.

Referring again to FIGS. 8 and 9, for machines to be effective partners with humans in predictive closed-loop swarms, the machines must be able to generate unique forecasts that are relevant and diverse so as to complement human predictions. To support this, some embodiments of the current invention leverage the ability of humans to quickly process large amounts of unstructured data, in parallel, and find relevant information. This is achieved by deploying teams of human information gatherers (e.g., "human scouts") to consider the given query and perform their own individual online research, identifying information that they believe is most valuable for answering the question at hand. This leverages a unique strength of humans over machines, for the scouts will leverage their domain-specific knowledge and critical reasoning abilities to identify relevant information to be used by the machine forecasting system. This pre-processing step will prime our machine forecasting system, enabling efficient machine predictions.

Human Scouting: When responding to a question, a small team of humans (the web-interactive persons 802) are tasked with finding relevant information by performing independent web searches using their domain-specific knowledge and innate critical reasoning to parse the question, identify sources, and categorize findings. Data and metadata from these searches will be collected using an instrumented web browser that tracks scouting behavior and asks individuals to rate the quality and significance of the documents they identify as relevant. This data is then aggregated and used as training signals for our machine forecasting system. This turns the problem of generating a machine forecast from one of programmatic reasoning across multiple domains to a straightforward supervised learning problem. The instrumented web browser can be embodiment as standard version of Chrome with a custom plugin that records all web pages visited during the search and enables the human scout to identify and tag relevant content as whole documents, highlighted passages, or identified datasets. Scouts will evaluate content on a number of vectors, including (a) "importance"—the perceived significance of the reference, (b) "bent"—whether the reference is in support or opposition for the question at hand; (c) "validity"—the trustworthiness of the source.

The Machine Intelligence system (in the present embodiment the forecast software 808 running on the forecast computing device 806) analyzes the scouted information to generate a set of forecast probabilities (one embodiment of the machine forecast data 614). A wide variety of well-known machine learning methods could be used in this step (for example, reinforcement learning), but those specifics are outside the scope of this invention. The key to this invention is that an artificial intelligence system produces its own response to a given question. The response is formed as a set of probabilities (or preference percentages) for each of a plurality of possible answers to the given question. We refer to the set of probabilities (or preference percentages) that indicate the machine's response to the given question, with respect to the set of possible answers, as a "Machine Forecast". Because the system in some embodiments could include a plurality of different A.I. systems (i.e. a plurality of instances of forecast software 808), each of which providing its own response to the query, we describe this process as generating one or more Machine Forecasts.

Figure 10:
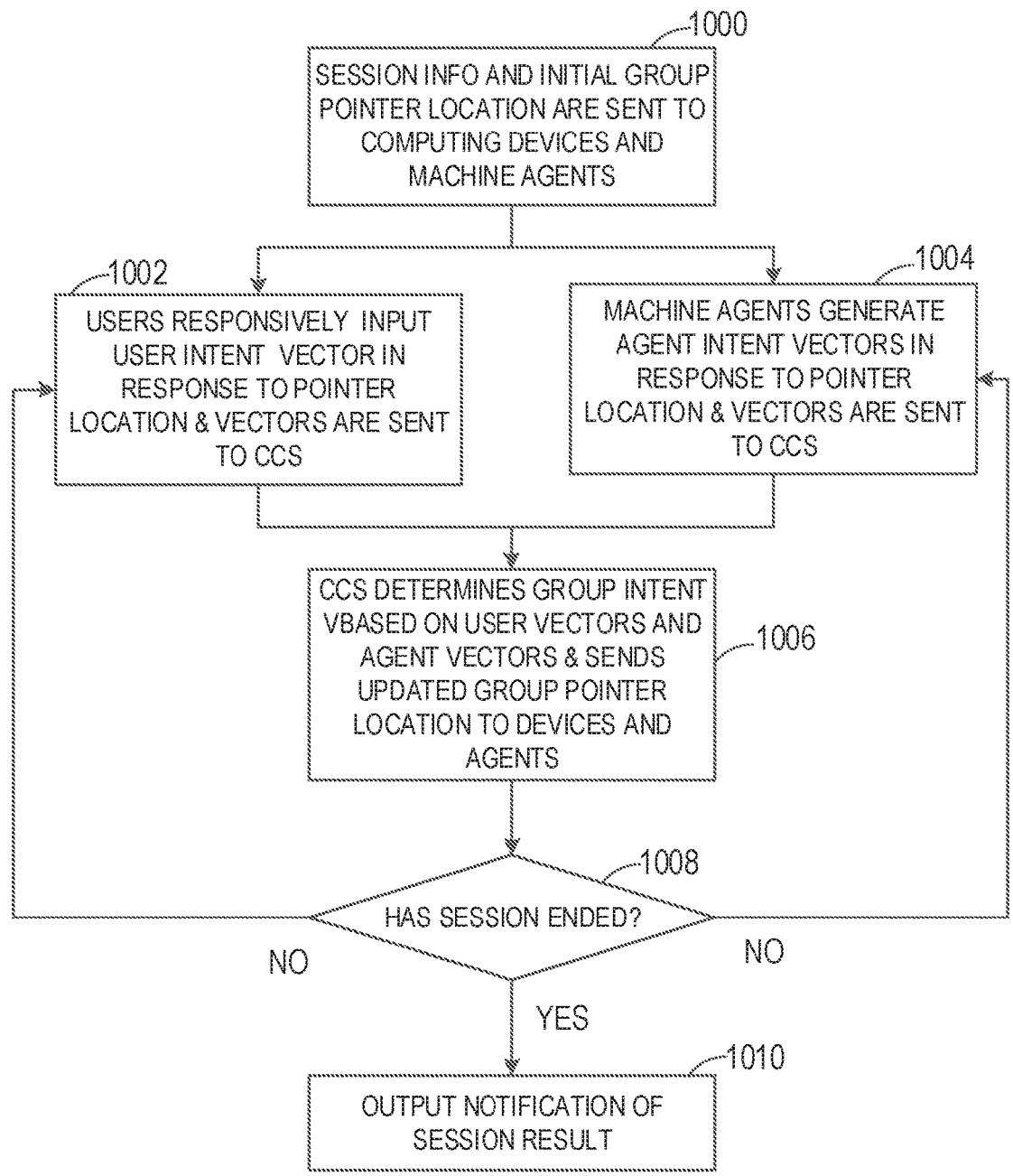
FIG. 10 is a flowchart for an exemplary hybrid swarm intelligence system collaboration session.

Referring next to FIG. 10, a flowchart for an exemplary hybrid swarm intelligence system collaboration session is shown. In the first send session information step 1000, as previously described the CCS 102 sends initial data regarding the group collaboration session to the plurality of computing devices 104. The data/information includes the set of targets 230 with one answer choice 208 associated with each target 230. Also sent are indications as to which target 230 (i.e. at which spatial location) each answer choice 208 is associated with. Additional information includes a start signal indicating the start of the answer period.

During the session, the user intent vector step 1002 and the agent intent vector step 1004 run concurrently. During the user intent vector step 1002, based on the session information displayed on the computing device 104, each user provides input to their computing device 104, as previously described. Each CIA 110 determines the user intent vector 612 in response and sends the user intent vector 612 to the CCS 102. During the agent intent vector step 1004, the agent application 604, in response to the information sent from the CCS 102, determines the plurality of agent intent vectors 608 based on the machine forecast and machine learning methods and parameters previously described. The agent application 604 sends the agent intent vectors 608 to the CCS 102. In the present embodiment, the user intent vectors 612 and agent intent vectors 608 include a magnitude and a direction of the response. The intent vectors 608, 612 may also include a location relative to the collaborative pointer, and any other relevant data.

During the next determine group intent step 1006, the CCS 102 determines the group intent 610 based on the agent intent vectors 608 and the user intent vectors 612. The CCS 102 then determines the updated pointer coordinate location (in relation to the set of targets 230) from the group intent 610 and sends the pointer location to the agent application 604 and the plurality of computing device 104.

At the session end decision point 1008, if the session has ended, the process proceeds to the session result step 1010, and the CCS 102 sends an indication of the end of the session and the result to the agent application 604 and the computing devices 104. If the session has not ended, the process returns to the user intent vector step 1002 and the agent intent vector step 1004, and the closed-loop process repeats until the session is ended.

Referring again to FIG. 10, the agent application 604 and the CIA 110 repeatedly receive real-time data from the CCS 102 that moderates the swarm during the swarm session as the population answers a question. That real-time data includes a) a timer signal indicating the elapsed time during the question, b) a locative signal indicating the location of the collaboratively controlled pointer 210 with respect to the targets 230, c) an engagement signal, indicating the number of engaged human users 602 that are currently applying their intent to move the collaboratively controlled pointer. In addition to the data that is repeatedly sent, there are also the start signal indicating the start of the answer period, and the end signal indicating that the question has been answered by the group by moving the pointer to a target. In addition, the set of answer choices 208 are provided to the agent application 604 and the CIA 110, with indications as to which target 230 (i.e. at which spatial location) each answer choice 208 is associated with.

The agent application 604 uses the information about the relative location of the target locations 230 with respect to the simulated spatial location of the software-controlled pointer in the simulated software environment, to determine an agent intent by simulating the user intent from a human user based on the machine model. The collaboratively controlled pointer also uses the amount of elapsed time, and optionally the speed and direction of motion of the collaboratively controlled pointer. In this way, the continuously changing dynamics of the pointer, along with the among of time that has passed, is used by the machine model to update the simulated user intent such that it behaves in much the same way that a user would during the changing conditions of the swarming session.

In addition, the agent application 604 repeatedly sends real-time data to the CCS 102 that is moderating the swarm during the swarm session as the population answers a question. That real-time data includes the agent intent vector 608 with computed position and orientation of one or more simulated magnets with respect to the collaboratively controlled pointer. This position and orientation can be represented in polar coordinates in some embodiments, for example as an angle around the pointer, and a distance from the pointer. While the icon is a "magnet" in current embodiments, other graphical representations can be used to translate the position and orientation signal into an indication of intent from the agent application 604.

Figure 11:
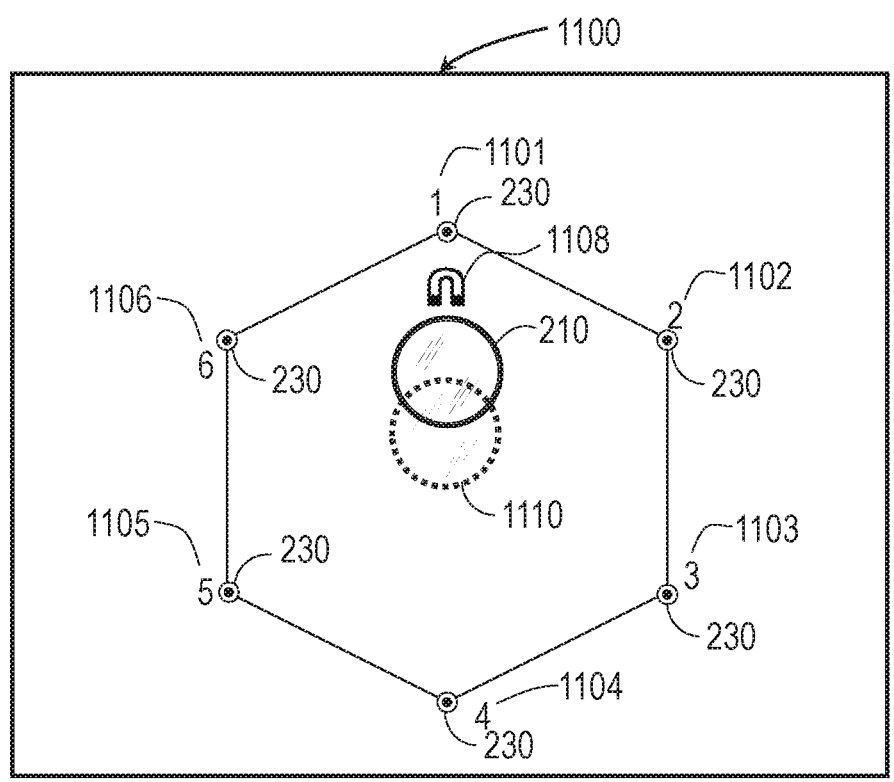
FIG. 11 is an exemplary display interface at a first point in time during a group collaboration session.
Figure 12:
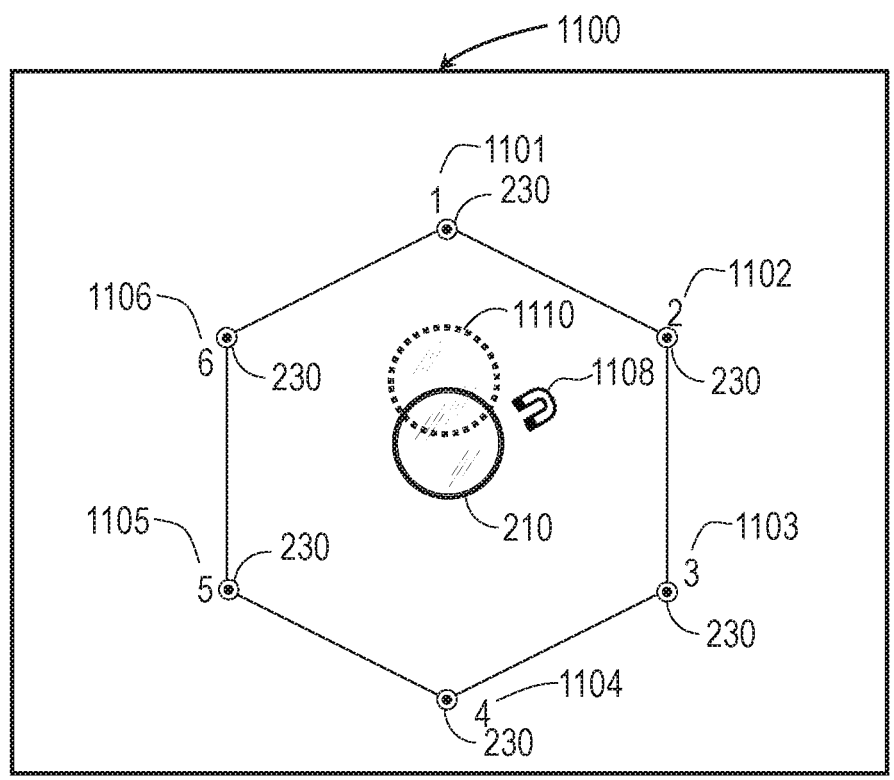
FIG. 12 is the exemplary display interface at a second point in time during the group collaboration session.
Figure 13:
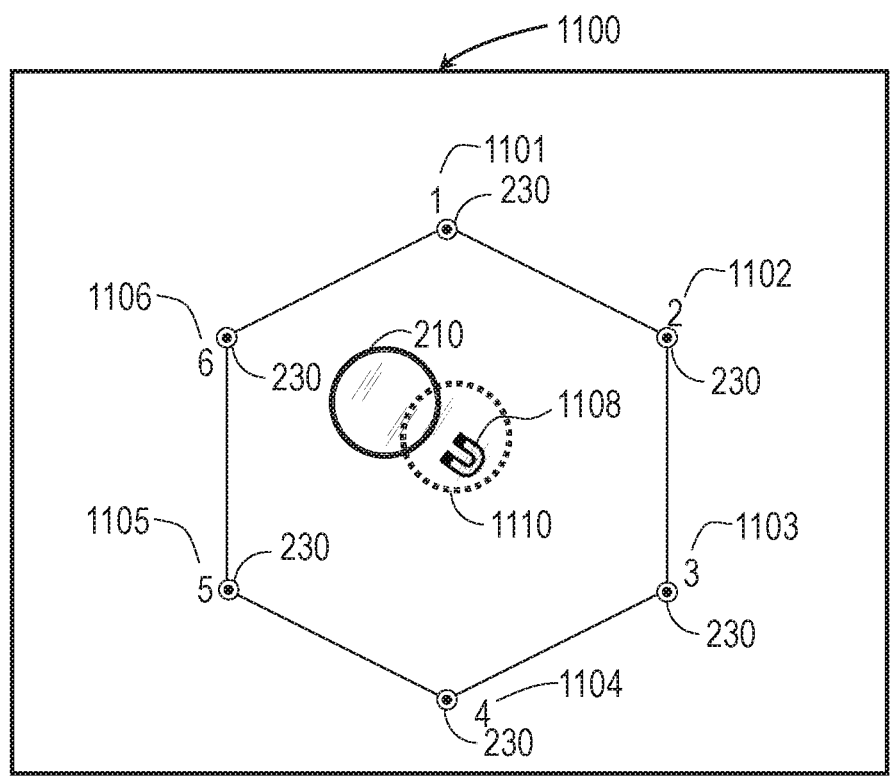
FIG. 13 is the exemplary display interface at a third point in time during the group collaboration session.

Referring next to FIGS. 11-13, an exemplary display interface 1100 is shown with an agent intent graphical representation 1108 during a group collaboration session. FIG. 11 is at a first point in time during the session, FIG. 12 is at a second point in time during the session, and FIG. 13 is at a third point in time during the session. Shown are the target area 206, the plurality of target locations 230, the pointer 210, a first answer choice 1101, a second answer choice 1102, a third answer choice 1103, a fourth answer choice 1104, a fifth answer choice 1105, a sixth answer choice 1106, the agent intent graphical representation 1108, and a previous pointer location 1110. For clarity, magnet icons corresponding to users interacting with computing devices and to additional agent intents are not shown.

In the example shown in FIGS. 11-13, the following exemplary machine forecast 614 for six options, numbered 1-6, has been generated:

| Answer Choice | Percentage |
| --- | --- |
| 1 | 56% |
| 2 | 23% |
| 3 | 10% |
| 4 | 6% |
| 5 | 4% |
| 6 | 1% |

During the collaboration session, as previously described the agent application 604 uses the machine forecast 614, along with the techniques and algorithms as previously described, to govern the output values of the agent intent vector 608 during the course of the collaboration session. The resulting agent intent vector 608 is shown graphically represented as the agent intent graphical representation 1108, similarly to the magnet icon 306 representation for each user intent vector 612. It will be understood that other graphical representation for the agent intent may be used during the collaboration session.

As shown in FIG. 11, initially the agent intent graphical representation 1108 will indicate the agent intent vector 608 pulling in the direction of the first answer choice 1101 "1", since "1" has the highest percentage from the machine forecast 614 and the pointer 210 is moving in the direction of the first answer choice 1101.

However, when the collaboration moves the pointer 210 away from the answer choice with the highest percentage (the first answer choice 1101 in this example), the agent application 604 switches the direction of the agent intent vector 608 to pull towards the answer choice with the second-highest percentage, in this case the second answer choice 1102 "2". This is shown in FIG. 12, where the pointer 210 is shown moving away from the first answer choice 1101, and the agent intent graphical representation 1108 shows the agent intent vector 608 pulling towards the second answer choice 1102 "2".

In the case where the group causes the pointer 210 to move towards one of the low-percentage options, such as shown in FIG. 13 where the pointer 210 is moving towards the sixth answer choice 1106 "6", with only a 1% percentage, the agent application 604 changes the direction of the agent intent vector 608 to be opposite to the direction of the sixth answer choice 1106. In this way, the agent application 604 mimics the behavior of humans in defending against low-preference options.

Referring again to FIGS. 11-13, the agent application 604 is programmed to result in a desired decision protocol, one example of which is illustrated in FIGS. 11-13. In general terms, one example of the determination of the agent intent vector 608 during the session is that the application algorithm starts with a with a preferred answer choice as a desired answer and switches to an alternate answer choice based at least in part upon how much time has elapsed and the motion of the software-controlled pointer 210 over time during the session.

The algorithm could alternatively include the agent intent vector 608 directed towards the preferred answer choice 208 at a first moment in time and then switching to indicating a desired motion of the software-controlled pointer to an alternate answer choice at a second moment in time.

Additionally, the algorithm could start with a preferred answer choice as a desired answer and switch to a second answer choice based at least in part upon the motion of the software-controlled pointer 210 over an elapsed time and then switching again to a third answer choice based at least in part upon the motion of the software controlled pointer 210 over an additional elapsed time, or at a third moment in time.

In some embodiments the agent application 604 receives data regarding the plurality of user intent vectors 612 indicating a distribution of users pulling for each of a plurality of different answer choices 208 over time and determines the agent intent vector 608 at least in part to a distribution of users pulling for each of a plurality of different answer choices 208 over time.

In other embodiments the agent application algorithm uses an allowed time left in the collaborative session for answering the question as a parameter for determining the time-varying machine agent value/agent input vector 608.

Some of the functional units described in this specification have been labeled as applications or modules, in order to more particularly emphasize their implementation independence. An identified module or application of executable code may, for instance, comprise one or more physical or logical blocks of computer instructions that may, for instance, be organized as an object, procedure, or function. Nevertheless, the executables of an identified application need not be physically located together, but may comprise disparate instructions stored in different locations which, when joined logically together, comprise the application and achieve the stated purpose for the application.

Indeed, an application of executable code could be a single instruction, or many instructions, and may even be distributed over several different code segments, among different programs, and across several memory devices. Similarly, operational data may be identified and illustrated herein within applications, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A hybrid intelligence system for enabling human participants and machine agents to converge on an answer to a question together as a real-time dynamic system during a group collaboration session, the system comprising:
   a central server in networked communication with a plurality of computing devices;
   a software-controlled pointer for selecting the answer from a set of answer choices, the selection based at least in part upon a simulated spatial location of the software-controlled pointer in a simulated software environment;
   a plurality of simulated target locations in the simulated software environment, each of the plurality of simulated target locations being associated with one answer choice of the set of answer choices;
   a plurality of time-varying user input values, wherein each computing device is configured to repeatedly determine at least one user input value based on user input and repeatedly send the at least one user input value to the central server, wherein each time-varying user input value represents a user-directed motion of the software-controlled pointer with respect to the plurality of target location across a plurality of time steps during the group collaboration session; and
   at least one time-varying machine agent value received by the central server, the at least one time-varying machine agent value representing an agent-directed motion of the software-controlled pointer with respect to the plurality of simulated target locations across the plurality of time steps, wherein the at least one time-varying machine agent value is determined using at least one pre-determined rule, wherein the central server is configured to update the simulated spatial location of the software-controlled pointer with respect to the plurality of simulated target locations in the simulated software environment based at least in part upon the plurality of time-varying user input values and the at least one time-varying machine agent value, resulting in a collaborative motion of the software-controlled pointer, whereby the answer is determined during the group collaboration session based at least on part upon an elapsed time and a relative location of the software-controlled pointer to at least one simulated target location.

2. The hybrid intelligence system of claim 1, wherein each at least one time-varying user input value comprises, at least in part, a repeatedly updated user intent vector with a magnitude and a direction.

3. The hybrid intelligence system of claim 1, wherein the at least one time-varying machine agent value comprises at least in part a repeatedly updated agent intent vector with a magnitude and a direction.

4. The hybrid intelligence system of claim 1, wherein the at least one time-varying machine agent value is determined by a machine forecast system including forecast software configured to generate the at least one time-varying machine agent value in response to a machine model for answering questions, the machine model including the at least one pre-determined rule, and generate a repeatedly updated coordinate representing the location of the software-controlled pointer in the simulated software environment.

5. The hybrid intelligence system of claim 4, wherein the machine model includes at least one percent likelihood associated with each of the plurality of answer choices.

6. The hybrid intelligence system of claim 4, wherein the machine model includes a drift diffusion model.

7. The hybrid intelligence system of claim 4, wherein the machine model includes a heuristic algorithm that starts with a preferred answer choice from the set of answer choices as a desired answer and switches to an alternate answer choice from the set of answer choices based at least in part upon how much time has elapsed and the collaborative motion of the software-controlled pointer over time during the group collaboration session.

8. The hybrid intelligence system of claim 7 wherein the at least one time-varying machine agent value indicates the agent-directed motion of the software-controlled pointer towards the preferred answer choice at a first moment in time and then switches the agent-directed motion of the software-controlled pointer towards the alternate answer choice at a second moment in time.

9. The hybrid intelligence system of claim 4, wherein the machine model includes a heuristic model that starts with a preferred answer choice from the set of answer choices as a desired answer and switches to a second answer choice of the set of answer choices based at least in part upon the collaborative motion of the software-controlled pointer over an elapsed time and then switches to a third answer choice from the set of answer choices based at least in part upon and the collaborative motion of the software-controlled pointer over an additional elapsed time.

10. The hybrid intelligence system of claim 9, wherein the at least one time-varying machine agent value indicates the agent-directed motion of the software-controlled pointer towards the preferred answer choice at a first moment in time and then switches to indicating the agent-directed motion of the software-controlled pointer towards the second answer choice at a second moment in time and then switches to indicating the agent-directed motion of the software-controlled pointer towards the third answer choice at a third moment in time.

11. The hybrid intelligence system of claim 4, wherein the machine model uses as input information regarding the plurality of time-varying user input values.

12. The hybrid intelligence system of claim 11, wherein the machine model is responsive at least in part to a distribution of users pulling for each of a plurality of different answer choices, each from the set of answer choices, over time.

13. The hybrid intelligence system of claim 4, wherein the machine model is derived at least in part by performing machine learning upon a plurality of data sets collected when a group of human users control the software-controlled pointer when answering a plurality of previous questions of similar structure to the question.

14. The hybrid intelligence system of claim 4, wherein the machine model uses an allowed time left for answering the question as a parameter for determining the at least one time-varying machine agent value.

15. A method for enabling human participants and machine agents to converge on an answer to a question together as a real-time dynamic system during a group collaboration session comprising:

sending of initial session information including a set of answer choices, each answer choice associated with one of a set of simulated target locations in a simulated software environment, from a central server to a plurality of computing devices in communication with the central server;

sending, repeatedly in real-time during the group collaboration session, of a user input value from each computing device to the server in response to user input, wherein each time-varying user input value represents a user-directed motion of the software-controlled pointer with respect to the plurality of simulated target locations across a plurality of time steps during the group collaboration session;

sending to the central server, repeatedly in real-time during the group collaboration session, of at least one time-varying machine agent value from an agent application in communication with the central server, the at least one time-varying machine agent value representing an agent-directed motion of the software-controlled pointer with respect to the plurality of simulated target locations across the plurality of time steps, wherein the at least one machine agent value is determined using at least one pre-determined rule; and updating by the central server, repeatedly in real-time during the group collaboration session, the simulated spatial location of the software-controlled pointer with respect to the plurality of simulated target locations in the simulated software environment based at least in part upon the plurality of time-varying user input values and the at least one time-varying machine agent value, resulting in a collaborative motion of the software-controlled pointer, whereby the answer is determined during the group collaboration session based at least on part upon an elapsed time and a relative location of the software-controlled pointer to at least one simulated target location.

16. The method of claim 15, wherein each time-varying user input value comprises, at least in part, a repeatedly updated user intent vector with a magnitude and a direction.

17. The method of claim 15, wherein the at least one time-varying machine agent value comprises at least in part a repeatedly updated agent intent vector with a magnitude and a direction.

18. The method of claim 15, wherein the at least one time-varying machine agent value is determined by a machine forecast system including forecast software configured to generate the at least one time-varying machine agent value in response to a machine model for answering questions, the machine model including the at least one pre-determined rule, and generate a repeatedly updated coordinate representing the location of the software-controlled pointer in the simulated software environment.

19. The method of claim 18, wherein the machine model includes at least one percent likelihood associated with each of the plurality of answer choices.

20. The method of claim 18, wherein the machine model includes a drift diffusion model.

21. The method of claim 18, wherein the machine model includes a heuristic algorithm that starts with a preferred answer choice from the set of answer choices as a desired answer and switches to an alternate answer choice from the set of answer choices based at least in part upon how much time has elapsed and the motion of the software-controlled pointer over time during the group collaboration session.

22. The method of claim 21, wherein the at least one time-varying machine agent value indicates the agent-directed motion of the software-controlled pointer towards the preferred answer choice at a first moment in time and then switches to indicating the agent-directed motion of the software-controlled pointer to the alternate answer choice at a second moment in time.

23. The method of claim 18, wherein the machine model includes a heuristic model that starts with a preferred answer choice from the set of answer choices as a desired answer and switches to a second answer choice from the set of answer choices based at least in part upon the collaborative motion of the software-controlled pointer over an elapsed time and then switches to a third answer choice from the set of answer choices based at least in part upon and the collaborative motion of the software-controlled pointer over an additional elapsed time.

24. The method of claim 23, wherein the at least one time-varying machine agent value indicates the agent-directed motion of the software-controlled pointer towards the preferred answer choice at a first moment in time and then switches to indicating the agent-directed motion of the software-controlled pointer towards the second answer choice at a second moment in time and then switches to indicating the agent-directed motion of the software-controlled pointer towards the third answer choice at a third moment in time.

25. The method of claim 18, wherein the machine model uses as input information regarding at least one time-varying user input value.

26. The method of claim 25, wherein the machine model is responsive at least in part to a distribution of users pulling for each of a plurality of different answer choices over time.

27. The method of claim 18, wherein the machine model is derived at least in part by performing machine learning upon a plurality of data sets collected when a group of human users control the software-controlled pointer when answering a plurality of previous questions of similar structure to the question.

28. The method of claim 18, wherein the machine model uses an allowed time left for answering the question as a parameter for determining the at least one time-varying machine agent value.

29. A hybrid machine intelligence method using a machine intelligence system and human scouts, the method comprising:

providing a central forecasting server in communication with a plurality of computing devices, each of the plurality of computing devices running a scouting application for use by a human user;

sending a forecasting query from the central forecasting server to each of the plurality of computing devices, the forecasting query indicating a forecasting question to be researched by the human user of the computing device by searching the internet;

enabling the human user of each computing device to search the internet in response to the forecasting query received from the central forecasting server while recording tracking data as the human user accesses web-based documents responsive to the forecasting query;

enabling the human user of each computing device to provide evaluation data regarding the web-based documents accessed by the user in response to the forecasting query, the evaluation data including an indication of at least one of importance, bent, and validity of each document accessed;

sending to the central forecasting server, from each computing device, scouting data regarding the web-based documents accessed by the human user including the tracking data and the evaluation data; and analyzing, by the central forecasting server, the scouting data from the plurality of human users in response to the forecasting query to produce a machine forecast, said machine forecast providing a set of probabilities regarding the likelihood of each of a plurality of possible outcomes related to the forecasting query.

30. The hybrid machine intelligence method of claim 29, wherein the steps of searching, tracking, and providing evaluation data are performed by an instrumented web browser on each of the plurality of computing devices that is configured to send data to the central forecasting server.

* * * * *